(12) United States Patent
Okada

(10) Patent No.: US 7,982,889 B2
(45) Date of Patent: Jul. 19, 2011

(54) IMAGE PROCESSING APPARATUS WITH ENERGIZATION CONTROL

(75) Inventor: Tadashi Okada, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 1225 days.

(21) Appl. No.: 11/652,035

(22) Filed: Jan. 11, 2007

(65) Prior Publication Data

US 2007/0183107 A1 Aug. 9, 2007

(30) Foreign Application Priority Data

Feb. 3, 2006 (JP) ................................. 2006-027229

(51) Int. Cl.
*G06K 15/00* (2006.01)
*G06F 3/12* (2006.01)
(52) U.S. Cl. ........................................ 358/1.14; 358/1.1
(58) Field of Classification Search .................. 358/1.13, 358/1.15, 1.1, 413, 419–423; 399/2, 8, 88, 399/90; 713/320, 321, 323, 330, 340, 375, 713/600
See application file for complete search history.

(56) References Cited

U.S. PATENT DOCUMENTS

| | | | |
|---|---|---|---|
| 5,764,864 A | 6/1998 | Sujita et al. | |
| 5,937,148 A | 8/1999 | Okazawa et al. | |
| 6,459,496 B1 | 10/2002 | Okazawa et al. | |
| 6,753,973 B2 * | 6/2004 | Hashimoto et al. | 358/1.14 |
| 6,785,012 B2 | 8/2004 | Okazawa et al. | |
| 6,950,953 B2 | 9/2005 | Kizawa et al. | |
| 2002/0149789 A1 | 10/2002 | Okazawa | |
| 2003/0140260 A1 | 7/2003 | Kizawa et al. | |
| 2004/0151513 A1 * | 8/2004 | Nomura | 399/8 |

FOREIGN PATENT DOCUMENTS

| | | |
|---|---|---|
| JP | 8-101606 A | 4/1996 |
| JP | 9-55812 A | 2/1997 |
| JP | 10-262130 A | 9/1998 |
| JP | 11-146103 A | 5/1999 |
| JP | 2002-99183 A | 4/2002 |
| JP | 2003-8794 A | 1/2003 |
| JP | 2003-63101 A | 3/2003 |
| JP | 2003-189018 A | 7/2003 |
| JP | 2003-233481 A | 8/2003 |
| JP | 2004-153742 A | 5/2004 |
| JP | 2004-193807 A | 7/2004 |
| JP | 2005-186425 A | 7/2005 |

* cited by examiner

*Primary Examiner* — Gabriel I Garcia
(74) *Attorney, Agent, or Firm* — Birch, Stewart, Kolasch & Birch, LLP

(57) ABSTRACT

To provide an image processing apparatus that can reduce power consumption as compared to a conventional case by energizing required minimum devices at an appropriate timing depending on contents of a request received from an external apparatus through a communicating medium during a power-saving state, if a data processing request is received from the external apparatus through a NIC during a sleep mode, an MPU of the NIC and an MPU of each controlling unit control automatic changeover switches, which switch energization states of sub-power sources, to control energization of each function block based on contents of the data processing request and the state of the own apparatus. When switching the function blocks from a "non-energized state" to an "energized state", a hierarchical energization controlling process is performed to switch the functional blocks with hierarchical relationships to the "energized state" in the order from higher to lower blocks.

15 Claims, 10 Drawing Sheets

FIG.5

| | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | | | | | | | | | | ** | ** | ** | ** | ** | ** | ** | ** | ** | ** | | | | | |
| Tue | | | | | | | | | | ** | ** | ** | ** | ** | ** | ** | ** | ** | ** | ** | ** | ** | | |
| Wed | | | | | | | | | | ** | ** | ** | ** | ** | ** | ** | ** | ** | ** | ** | ** | ** | | |
| Thu | | | | | | | | | | ** | ** | ** | ** | ** | ** | ** | ** | ** | ** | ** | ** | | | |
| Fri | | | | | | | | | | ** | ** | ** | ** | ** | ** | ** | ** | ** | ** | | | | | |
| Sat | | | | | | | | | | ** | ** | ** | ** | | | | | | | | | | | |
| Sun | | | | | | | | | | | | | | | | | | | | | | | | |

FIG.9

POWER SOURCE CONTROL RULE OF NIC

| | REFERENCE ORDER | 1 | 2 | 3 | 4 | 5 | |
|---|---|---|---|---|---|---|---|
| | RULE NUMBER | R1 | R2 | R3 | R4 | R5 | ← 401d |
| STATE OF APPARATUS | SLEEP CONDITION<br>WT: FIRST SLEEP CONDITION<br>NI: SECOND SLEEP CONDITION | NI | NI | WT | WT | | ← 201d |
| | AVAILABLE CAPACITY OF MEMORY | xxMB OR MORE | xxMB OR MORE | | | | ← 202d |
| | NUMBER OF DATA PROCESSING REQUESTS RETAINED IN MEMORY | | LESS THAN xx | LESS THAN xx | LESS THAN xx | | ← 203d |
| CONTENTS OF DATA PROCESSING REQUEST | AUTHORITY OF SENDER (SU, NU)* | SU | NU | NU | NU | | ← 301d |
| | FORMAT OF IMAGE DATA | | | | | | ← 302d |
| | PDL TYPE | | | ECS/P or PCL | | | ← 303d |
| | PRIVACY SPECIFICATION | | | | | | ← 304d |
| | POST-PROCESS SPECIFICATION | | | | | | ← 305d |
| | RESERVATION TIME | YES | | | | | ← 306d |
| | IMMEDIATE PROCESS SPECIFICATION | | NO | | | | ← 307d |
| | SECRET SPECIFICATION | NO | NO | NO | NO | | ← 308d |
| | SIZE OF PROCESS TARGET DATA** | LESS THAN xxMB | LESS THAN xxMB | | | | ← 309d |
| | FILE FORMAT OF PROCESS TARGET DATA** | | | | TXT | | ← 310d |
| | REQUEST TYPE***<br>(PR,SC,DF) | | | PR | PR or DF | | ← 311d |
| | FIRST SUB-POWER SOURCE | OFF | OFF | OFF | OFF | ON | ← 402d |
| | PROCESS**** | H | H | H | H | I | ← 403d |

CONTENTS OF CONTROL

\* : "SU" AND "NU" STAND FOR SUPER USER AND NORMAL USER, RESPECTIVELY.

\*\* : PROCESS TARGET DATA ARE PRINT IMAGE DATA OR WRITE DATA FOR DATA FILING PROCESS.

\*\*\* : "PR", "SC" AND "DF" STAND FOR PRINT REQUEST, SCAN REQUEST AND DATA FILING REQUEST, RESPECTIVELY.

\*\*\*\* : "H" DATA PROCESSING REQUEST IS STORED IN FLASH MEMORY. "I" DATA PROCESSING REQUEST IS DELIVERED TO MAIN CONTROLLING UNIT.

FIG.10

POWER SOURCE CONTROL RULE OF MAIN CONTROLLING UNIT

| | | | | | | | | | |
|---|---|---|---|---|---|---|---|---|---|
| | REFERENCE ORDER | 1~4 | 5 | 6 | 7 | 8 | 9 | 10 | 401d |
| | RULE NUMBER | R1~R4 | R5 | R6 | R7 | R8 | R9 | R10 | |
| STATE OF APPARATUS | SLEEP CONDITION WT: FIRST SLEEP CONDITION NI: SECOND SLEEP CONDITION | ※ | | | | | | | 201d |
| | AVAILABLE CAPACITY OF MEMORY | ※ | | | | | | | 202d |
| | NUMBER OF DATA PROCESSING REQUESTS RETAINED IN MEMORY | ※ | | | | | | | 203d |
| | NUMBER OF DATA PROCESSING REQUESTS RETAINED IN HDD | | LESS THAN xx | | | | | | 204d |
| CONTENTS OF DATA PROCESSING REQUEST | AUTHORITY OF SENDER (SU,NU) | ※ | NU | | | | | | 301d |
| | FORMAT OF IMAGE DATA | | JPEG or TIF | | | | | | 302d |
| | PDL TYPE | ※ | | | | | | | 303d |
| | PRIVACY SPECIFICATION | ※ | | YES | | | | | 304d |
| | POST-PROCESS SPECIFICATION | ※ | | | YES | | | | 305d |
| | RESERVATION TIME | ※ | | | | | | | 306d |
| | IMMEDIATE PROCESS SPECIFICATION | ※ | NO | | | | | | 307d |
| | SECRET SPECIFICATION | ※ | NO | | | | | | 308d |
| | SIZE OF PROCESS TARGET DATA** | ※ | | | | | | | 309d |
| | FILE FORMAT OF PROCESS TARGET DATA** | ※ | | | | | | | 310d |
| | REQUEST TYPE(PR,SC,DF) | ※ | PR | PR | PR | PR | SC | DF | 311d |
| | SUB-POWER SOURCES 2&6 | OFF | OFF | OFF | OFF | OFF | [ON] | OFF | |
| | SUB-POWER SOURCES 3&7&8 | OFF | OFF | OFF | [ON] | [ON] | OFF | OFF | 402d |
| | SUB-POWER SOURCES 4&9 | OFF | OFF | OFF | [ON] | OFF | OFF | OFF | |
| | SUB-POWER SOURCE 5 | OFF | [ON] | [ON] | [ON] | [ON] | [ON] | [ON] | |
| | PROCESS**** | | J | K | K | L | L | L | L | 403d |

CONTENTS OF CONTROL

※ : SAME AS POWER SOURCE CONTROL RULE OF NIC
**** : "J" DATA PROCESSING REQUEST IS STORED IN FLASH MEMORY.
"K" DATA PROCESSING REQUEST IS STORED IN HARD DISK.
"L" NORMAL PROCESS

IMAGE PROCESSING APPARATUS WITH ENERGIZATION CONTROL

This Non-provisional application claims priority under 35 U.S.C. §119 (a) on Patent Application No. 2006-027229 filed in JAPAN on Feb. 3, 2006, the entire contents of which are hereby incorporated herein by reference.

FIELD OF THE INVENTION

The present invention relates generally to an image processing apparatus including a communicating medium that communicates with an external apparatus, and more particularly, to an image processing apparatus that is preferable for power saving.

BACKGROUND OF THE INVENTION

Generally, an image processing apparatus, such as a multifunctional peripheral (MFP) including a printer, scanner, facsimile machine, and copier or functions thereof, includes a communicating medium (such as a NIC (Network Interface Card) or modem (Modulator-Demodulator)) that communicates with an external apparatus (such as a computer or other image processing apparatuses) through a communication medium such as a network or telephone lines. Some of such image processing apparatuses include a function (hereinafter, a sleep function) for shifting to a power-saving state (generally, referred to as a sleep mode) with lower power consumption than a normal operation state if no operation is performed for an operation input unit included in the image processing apparatus and no data are received from the external apparatus through the communicating medium for a certain time period or more. In the power-saving state, for example, energization (power supply) is discontinued for a fixing device including a heater and devices such as a control circuit, while the communicating medium is often maintained in an energized state. This is because in the power-saving state, energization of devices in a non-energized state is resumed in response to a request from the external apparatus to allow the devices to automatically return to the normal operation state. For example, in an image forming apparatus shown in Japanese Laid-Open Patent Publication No. H8(1996)-101606, when an energized communicating medium receives a print request in a power-saving state, the entire apparatus is energized to form an image in accordance with the received print request.

The requests from the external apparatuses include various requests such as a print request that requests to form an image on a recording paper sheet, an image scan request that requests to read an image formed on a document, and a request for performing a process of accessing a storage unit such as a hard disk included in the image processing apparatus to manipulate a data file (hereinafter, a data filing process). The data filling process may be processes of writing or updating data, reading data, erasing data, and changing data file names, for example.

On the other hand, in an image forming apparatus shown in Japanese Laid-Open Patent Publication No. 2005-186425, when an energized controller receives an access request for a hard disk from an external apparatus through a network in a power-saving state, energization of the hard disk is started to perform the requested process.

In an MFP shown in Japanese Laid-Open Patent Publication No. 2003-63101, when a print request is received through an external interface in a power-saving state where a sub-CPU and the external interface are supplied with electric power from a sub-power source, the sub-CPU supplies electric power to a main CPU controlling the entire apparatus to perform printing.

However, when an apparatus is in a power-saving state and some sort of process is requested by an external apparatus through a communicating medium, if energization is always started for many non-energized devices due to the request to perform the requested process, it is problematic that sufficient power-saving cannot be achieved.

Particularly, in the case of an MFP including many devices corresponding to a variety of functions and shared by many users, many types of requests are received from external apparatuses through a communicating medium and the requests may have different degrees of importance or urgency. Therefore, it is important for achieving further power-saving to energize the required minimum devices at an appropriate timing depending on contents of a request received during the power-saving state.

SUMMARY OF THE INVENTION

The object of the present invention is to provide an image processing apparatus that can reduce power consumption as compared to the conventional case by energizing required minimum devices at an appropriate timing depending on contents of a request received from an external apparatus through a communicating medium during a power-saving state.

The present invention is an image processing apparatus including a communicating medium that communicates with an external apparatus such as a computer or other image processing apparatuses and has the following characteristic configurations.

That is, the present invention is configured as an image processing apparatus comprising a plurality of function blocks, each of which is a part or a group of parts sectionalized in accordance with functions; an energization switching circuit that switches whether energization is performed for a power source that supplies power to each of the function blocks individually; and an energization controlling unit that controls the energization switching circuit based on contents of a data processing request to control energization of each of the function blocks when the communicating medium receives the data processing request from the external apparatus.

As a result, during a power-saving state, the image processing apparatus can control itself by controlling the energization controlling unit such that only the required minimum function blocks become an energized state depending on contents of the data processing request received from the external apparatus through a communicating medium. The power-saving state as used herein refers to a state when the function blocks are in the non-energized state and devices configuring the communicating medium and the energization controlling unit are in the energized state.

If the energization controlling unit controls the energization switching circuit to control which one of the function blocks in the non-energized state is put into the energized state at what timing, the required minimum function blocks can be energized at an appropriate timing depending on the contents of the data processing request received through the communicating medium.

It is more preferable that the energization controlling unit controls the energization switching circuit also based on the state of the image processing apparatus at the time of receiving the data processing request with the communicating medium from the external apparatus.

If the function blocks have hierarchical relationships from higher to lower orders, it is more preferable that the energization controlling unit performs the following hierarchical energization controlling process.

The hierarchical energization controlling process is a process of switching the function blocks to the energized state in the order from higher to lower blocks when switching the function blocks from the non-energized state to the energized state. For example, in the hierarchical energization controlling process, the function blocks may be switched to the energized state in the order from higher to lower blocks until the image processing apparatus becomes the state where the apparatus enables the execution of the process corresponding to the contents of the data processing request.

Therefore, the control can be performed such that the lower function blocks are sequentially put into the energized state only if the process corresponding to the contents of the data processing request cannot be executed even when the higher function blocks are put into the energized state. As a result, the control can be performed such that only the required minimum function blocks are energized.

When switching the function blocks from the energized state to the non-energized state, the energization controlling unit may switch the function blocks to the non-energized state in the order from lower to higher blocks or switch lower and higher blocks at substantially the same time.

When executing the hierarchical energization controlling process, a more specific configuration example may be as follows.

That is, the energization controlling unit includes a unit (hereinafter, a first energization controlling unit) that controls a portion of the energization switching circuit that switches the energization for the highest function block, and a unit (hereinafter, a second energization controlling unit) included in the function block to control a portion of the energization switching circuit that switches the energization for the function block one-order lower than the relevant function block, and when switching the function blocks from the non-energized state to the energized state, the energization controlling unit performs the hierarchical energization controlling process by performing a process of switching the highest function block to the energized state with the first energization controlling unit and a process of switching the one-order lower function block to the energized state with the second energization controlling unit included in the function block switched to the energized state.

Therefore, unless the higher function block becomes the energized state, the lower function block cannot be switched from the non-energized state to the energized state. As a result, the logic of the energization control becomes simple, resulting in prevention of errors in the control.

A more specific configuration example of the image processing apparatus executing the hierarchical energization controlling process may be as follows.

That is, the function blocks capable of being switched by the energization switching circuit with regard to whether individually energized or not may include a plurality of controlled blocks that include one or both of a driving unit such as a motor and a heating unit, a plurality of local controlling blocks that individually controls one or more of the plurality of the controlled blocks, and a main controlling block that gives/receives information necessary for a data process or information acquired from a data process to/from each of the plurality of the local controlling blocks, and hierarchical relationships from higher to lower orders may be formed in the order of the main controlling block, the local controlling block, and the controlled block.

For example, the controlled block may include an image formation controlled block including a driving unit and a heating unit for an image forming process and an image read controlled block including a driving unit for an image read process, and the local controlling block includes an image formation controlling block that controls the driving unit and the heating unit of the image formation controlled block and an image read controlling block that controls the driving unit of the image read controlled block.

With the above configuration, unless the local controlling block becomes the energized state earlier, the energization controlling unit cannot switch the lower controlled block controlled by the local controlling block from the non-energized state to the energized state. As a result, the controlled block on the controlled side can certainly be prevented from falling into an unsafe situation where energization is started in an uncontrollable state (state where the higher local controlling block is not energized).

With the hierarchical energization control process, the control can be performed such that the energization is started for the controlled block including the driving unit and the heating unit, which have higher power consumption, only when the data processing request cannot be supported by only energizing other function blocks. As a result, a higher power-saving effect can be achieved since the frequency of energization is reduced in the controlled block, which has higher power consumption.

If any function blocks exist at a lower order than the function block that is the target of the energization control, it is desirable that the first energization controlling unit and the second energization controlling unit can switch the function block that is the target of the energization control from the energized state to the non-energized state only when all those function blocks are in the non-energized state.

Therefore, an unsafe situation can certainly be prevented where the local controlling block controlling the controlled block is switched to the non-energized state before switching the controlled block on the controlled side.

The energization controlling unit may determine contents of the data processing request, which are one or more of the following items (1) to (8), and may control the energization switching circuit based on the results of the determination:

(1) whether the data process should be performed immediately due to the request;

(2) whether the execution of the data process is reserved by the request;

(3) whether the request is an image formation request;

(4) a size of image data in the case of the image formation request;

(5) a type of image data in the case of the image formation request;

(6) a type of a page-description language used to express the image formation request in the case of the image formation request;

(7) whether the request is an image read request; and (8) whether the request is a request for accessing a storage unit included in the image processing apparatus to manipulate a data file.

If it is determined that the contents of the data processing request received by the communicating medium do not request immediate execution of the data process, when a predetermined execution start condition is satisfied after storing the data processing request in a predetermined storage unit, the energization controlling unit may perform control of switching the function blocks corresponding to the data processing request stored in the storage unit from the "non-energized state" to the "energized state" (hereinafter, a request buffering energization control).

The predetermined condition may be one or more of the following conditions (1) to (4):

(1) a predetermined number of the data processing requests are stored in the storage unit;

(2) the total data size of the data processing requests stored in the storage unit becomes a predetermined size or more;

(3) the remaining capacity of the storage unit storing the data processing requests becomes less than a predetermined size; and (4) a predetermined time has elapsed since the first data processing request was stored in the storage unit.

By performing the request buffering energization controlling process, a plurality of the data processing requests with less urgency is temporarily accumulated and processed all together. As a result, power consumption can be reduced as compared to the case of starting energization of the function block to execute a process every time the data processing request is received.

The energization controlling unit may determine the state of the image processing apparatus, which is one or both of the following items (1) and (2), and may control the energization switching circuit based on the results of the determination:

(1) an available capacity of a storage unit included in the image processing apparatus; and (2) a control state of a weekly timer controlling unit that controls an energization state of each of the function blocks by controlling the energization switching circuit in accordance with a predetermined weekly schedule.

The communicating medium may be configured to act also as some or all of the constituent elements of the energization controlling unit.

BRIEF DESCRIPTION OF THE DRAWINGS

FIG. 5 is a schematic view of a weekly schedule of weekly timer control in the image processing apparatus X;

FIG. 9 depicts an example of a power source control rule of the NIC in the image processing apparatus X;

FIG. 10 depicts an example of a power source control rule of a controlling unit in the image processing apparatus X.

PREFERRED EMBODIMENTS OF THE INVENTION

Embodiments of the present invention will now be described with reference to the accompanying drawings for understanding of the present invention. The following embodiments are an embodied example of the present invention and do not have the nature of limiting the technical scope of the present invention.

Figure 1:
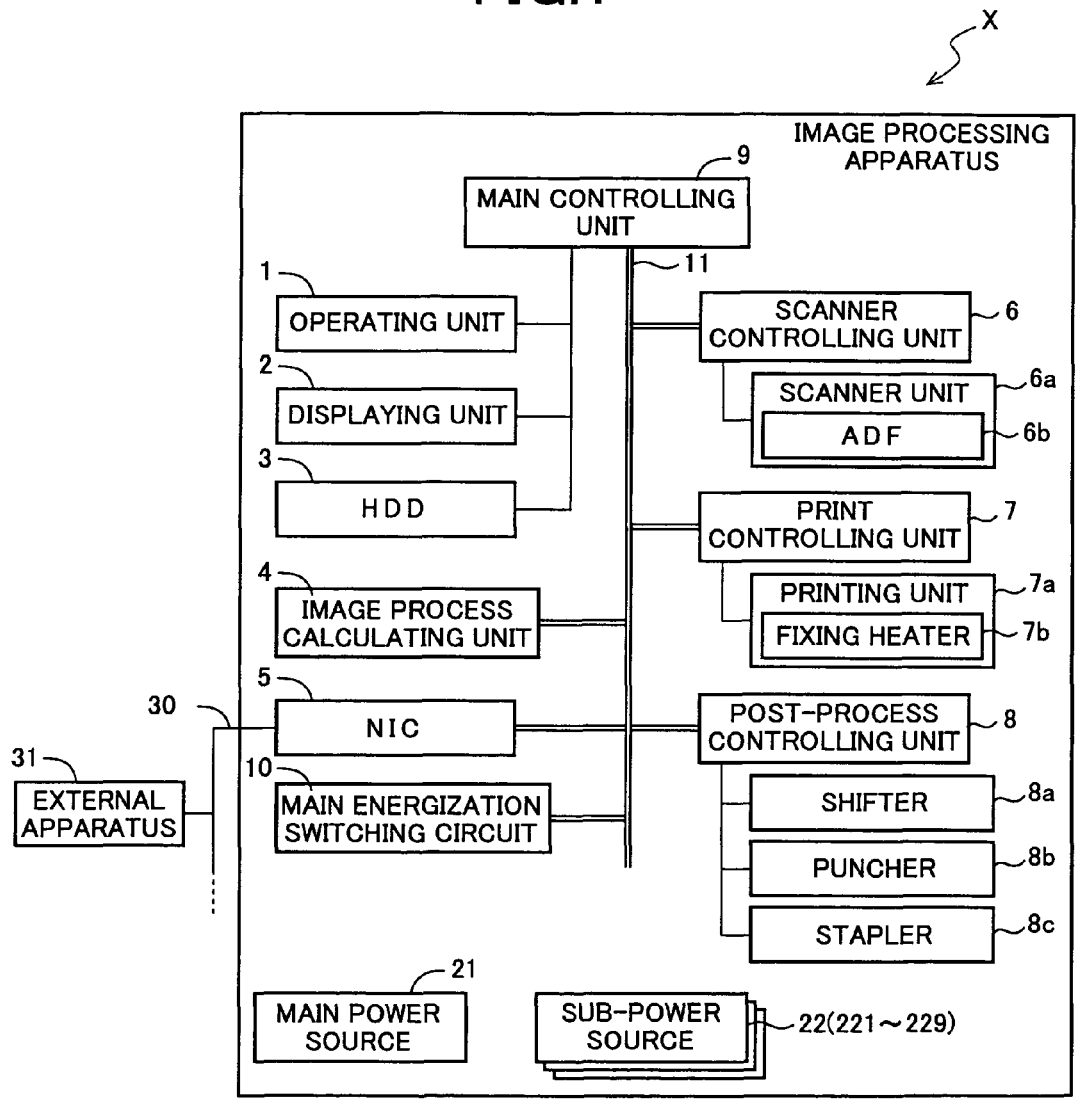
FIG. 1 is a block diagram of an outline configuration of an image processing apparatus X according to an embodiment of the present invention.

FIG. 1 is a block diagram of an outline configuration of an image processing apparatus X according to an embodiment of the present invention. The configuration of the image processing apparatus X will be described with reference to the block diagram shown in this FIG. 1.

The image processing apparatus X can communicate with an external apparatus 31 such as a personal computer through a network 30 such as LAN compliant with the IEEE 802.3 standard, for example, and includes a network interface card 5 (hereinafter, NIC), which is an example of a communicating means that communicates with the external apparatus 31.

As shown in FIG. 1, the image processing apparatus X includes an operating unit 1, a displaying unit 2, a hard disk drive 3 (hereinafter, HDD), an image process calculating unit 4, a scanner controlling unit 6, a scanner unit 6a, a print controlling unit 7, a printing unit 7a, a post-process controlling unit 8, a shifter 8a, a puncher 8b, a stapler 8c, a main controlling unit 9, a main energization switching circuit 10, a main power source 21, sub-power sources 22, etc., in addition to the NIC 5.

The scanner unit 6a includes an automatic document feeder 6b (hereinafter, ADF) and the printing unit 7a includes a fixing heater 7b.

In the example shown in FIG. 1, the main controlling unit 9, the image process calculating unit 4, the NIC 5, the scanner controlling unit 6, the print controlling unit 7, the post-process controlling unit 8, and the main energization switching circuit 10 are mutually connected through a bus 11.

The operating unit 1 is an operation input portion for inputting information and includes sheet keys, a touch panel disposed on a surface of a liquid crystal display apparatus, etc.

The displaying unit 2 is an information displaying portion and includes a liquid crystal display apparatus, LED lamp, etc. The operating unit 1 and the displaying unit 2 configure a man-machine interface for a user.

The HDD 3 is a large-capacity nonvolatile memory that stores process data as needed at the time of a process of read image data read from a document or a print process of image data. The HDD 3 is also used to save data files transmitted from the external apparatus 31 in response to a request from the external apparatus 31 that can communicate with the image processing apparatus X. A data filing process hereinafter indicates the process of saving the data files transmitted from the external apparatus 31 in the HDD 3 and processes of changing the saving locations (data folders) of the saved data files, changing file names, rewriting data, erasing data, etc.

The image process calculating unit 4 includes a dedicated signal processing circuit or a DSP (Digital Signal Processor), performs various image processes of image data, generates print data (such as image data and print job) used in image formation, generates image data (e.g., image data encoded in a predetermined format such as a JPEG format) to be transmitted to the external apparatus 31, and performs a process of encrypting the image data, decrypting the encrypted image data, compressing and encoding the image data, or decompressing (restoring) the compressed and encoded image data.

The scanner controlling unit 6 outputs a control signal to the scanner unit 6a and the ADF 6b that perform a process of reading an image from a document to control the scanner unit 6a and the ADF 6b.

The scanner unit 6a is a device that reads an image formed on a document from a document placed on a glass document platen not shown or a document conveyed by the ADF 6b. The scanner unit 6a is disposed with, for example, a light source that applies light to the image surface of the document and a mirror that reflects the reflected light from the document to a predetermined direction, in addition to the ADF 6b, and includes a movable optical unit configured to move along the document, a motor (an example of a driving unit) that drives the movable optical unit, a fixed mirror that guides the light emitted from the movable optical unit along a predetermined path, a lens that focuses the light, a CCD (Charged Coupled Device) that performs photoelectric conversion of the light having passed through the lens to output an electric signal corresponding to the amount of the light (i.e., light reflected by the image surface of the document), etc. When reading an image from the document placed on the document platen, the movable optical unit moves along the document and applies light to the image surface. On the other hand, when reading an image from the document conveyed by the ADF 6b, the movable optical unit is fixed to a predetermined position facing to the conveying path of the document and applies light to the document being conveyed. The electric signal output from the CCD is transmitted as image data to the image process calculating unit 4.

The ADF 6b is a device that conveys documents set in a document supply tray one-by-one along a predetermined conveying path to discharge the documents to a document discharge tray. The ADF 6b includes a paper feeding roller that sends documents from the document supply tray one-by-one to the document conveying path, a document conveying roller that conveys the documents through the document conveying path, and a motor that drives the rollers, for example.

The print controlling unit 7 outputs a control signal to the printing unit 7a that performs processes relating to the image forming process to control the printing unit 7a.

The printing unit 7a sequentially sends recording paper sheets contained in a paper feeding cassette not shown one-by-one to convey the recording paper sheets through a predetermined image forming position to a paper discharging tray and forms (outputs) images on the recording paper sheets at the image forming position based on the document image data read by the scanner unit 6a from the document, print data generated by the image process calculating unit 4, etc. The image processing apparatus X functions as a copier by performing an image forming process based on the document image data and function as a printer by performing an image forming process based on a print request (print job) received from the external apparatus 31.

The printing unit 7a includes a photoconductor drum that carries an image, a charging device that charges the photoconductor drum, an exposing device that writes an electrostatic latent image onto the photoconductor drum surface based on the given image data or print job, a developing device that develops the electrostatic latent image to a toner image, a transferring device that transfers the toner image on the photoconductor drum to the recording paper sheet, and a motor that drives the photoconductor drum and rollers for conveying the recording paper sheet, for example.

The printing unit 7a also includes a fixing device that heats and fixes the toner image transferred to the recording paper sheet, and the fixing device includes a heating roller including a fixing heater 7b therein, a pressing roller that presses the recording paper sheet with the transferred toner image against the heating roller, a motor that drives the rollers, etc.

The post-process controlling unit 8 outputs a control signal to the shifter 8a, the puncher 8b, and the stapler 8c that perform various post-processes for the recording paper sheet after the image formation to control the shifter 8a, the puncher 8b, and the stapler 8c.

The shifter 8a includes a movable tray disposed with a plurality of paper discharging trays and sorts the recording paper sheets in accordance with a predefined rule when the printing unit 7a sequentially performs the image forming process of a plurality of sets of sheets for a group of image data or print jobs (hereinafter, a set of jobs). The movable tray can shift positions of the paper discharging trays relative to a recording paper discharging port.

For example, the shifter 8a controls the movable tray such that the recording paper sheets after the image formation are discharged to each paper discharging tray for each set of jobs or each of the same pages. The puncher 8b performs a process of forming punch holes in the recording paper sheets after the image formation. The stapler 8c performs a staple binding process for a plurality of the recording paper sheets after the image formation. The shifter 8a, the puncher 8b, and the stapler 8c are hereinafter collectively referred to as post-process executing units.

With regard to the scanner controlling unit 6, the print controlling unit 7, and the post-process controlling unit 8 that respectively control the scanner unit 6a, the printing unit 7b, and the post-process executing unit 8a to 8c that directly perform each individual process of the image reading process, the image forming process, and the post-process for the recording paper sheets, these controlling units are hereinafter generally referred to as local controlling units.

The NIC 5 is a communication interface that transmits/receives data to/from the external apparatus 31 through the network 30 such as LAN compliant with the IEEE 802.3 standard, for example. The NIC 5 performs a process of transmitting to the external apparatus 31 the image data generated by the image process calculating unit 4, the image data read by the scanner unit 6a, or the data saved in the HDD 3, for example, a process of receiving various data processing requests from the external apparatus 31, etc. The data processing requests include a print request (so-called print job) that requests to form an image on recording paper, a scan request that requests to read an image from a document, a data filing request that requests to perform the data filing process.

The main power source 21 and the sub-power sources 22 are power source circuits supplying electric power to the components of the image processing apparatus X.

As described later, the main energization switching circuit 10 is a switch circuit that switches whether one of the sub-power sources is connected to a commercial power source in accordance with a control signal received from the NIC 5 to switch whether some devices such as the main controlling unit 9 are energized. Details thereof are described later.

The main energization switching circuit 10 is configured such that the switching state thereof is also changed by the control signal received from the operating unit 1.

The main controlling unit 9 controls each of the operating unit 1, the displaying unit 2, the HDD 3, and the image process calculating unit 4 and gives/receives to/from each of the scanner controlling unit 6, the print controlling unit 7, and the post-process controlling unit 8 the information necessary for the data processes performed by each of the controlling units and the information acquired from the data processes.

For example, the main controlling unit 9 delivers to the print controlling unit 7 the information such as a size of a recording paper sheet where an image will be formed, a magnification ratio and a density correction value of the output image, and whether a color image forming process or a monochrome image forming process is performed, while the main controlling unit 9 acquires from the print controlling unit 7 the information about how many recording paper sheets are completed in the image formation, the information about errors generated in the printing unit 7a, etc. The main controlling unit 9 delivers to the scanner controlling unit 6 the information of an image reading range in a document, etc., while the main controlling unit 9 acquires from the scanner controlling unit 6 the information about how many documents are completed using the ADF 6b in the image reading, the image data read by the scanner unit 6a, the information about errors generated in the ADF 6b, etc. The main controlling unit 9 delivers to the post-process controlling unit 8 information about a type of the sorting process by the shifter 8a, information about the number of recording paper sheets subjected to the punching process and the staple binding process by the puncher 8b and the stapler 8c, etc., while the main controlling unit 9 acquires from the post-process controlling unit 8 the information about errors generated in the shifter 8a, the puncher 8b, and the stapler 8c.

As described above, the main controlling unit 9, the HDD 3, the scanner controlling unit 6, the scanner unit 6a, the print controlling unit 7, the printing unit 7a, the post-process controlling unit 8, and the post-process executing units 8a to 8c are function blocks, each of which is configured as a part or a group of parts sectionalized in accordance with the functions.

In the relationship between the HDD 3 including the motor that rotates and drives the hard disk and the main controlling unit 9 controlling the HDD 3, the main controlling unit 9 has a higher order and the HDD 3 has a lower order.

The main controlling unit 9 is a function block that gives/receives to/from each of a plurality of the local controlling units 6 to 8 the information necessary for the data processes or the information acquired from the data processes and has a relationship where the main controlling unit 9 has a higher order and the local controlling units 6 to 8 have a lower order.

The scanner unit 6a and the post-process executing units 8a to 8c are functional blocks including various motors on the controlled side (examples of the controlled block) and have a lower order, and the scanner controlling unit 6 and the post-process controlling unit 8 controlling these blocks have a higher order in the relationship thereof.

Similarly, the printing unit 7a is a functional block including various motors and the fixing heater 7b on the controlled side (an example of the controlled block) and has a lower order, and the print controlling unit 7 controlling this block has a higher order in the relationship thereof.

Therefore, the highest function block is the main controlling unit 9; the next lower function blocks are the scanner controlling unit 6, the print controlling unit 7, and the post-process controlling unit 8; and the further lower function blocks are the scanner unit 6a, the printing unit 7a, and post-process executing units 8a to 8c. Thus, the function blocks have hierarchical relationships from higher to lower orders.

Figure 2:
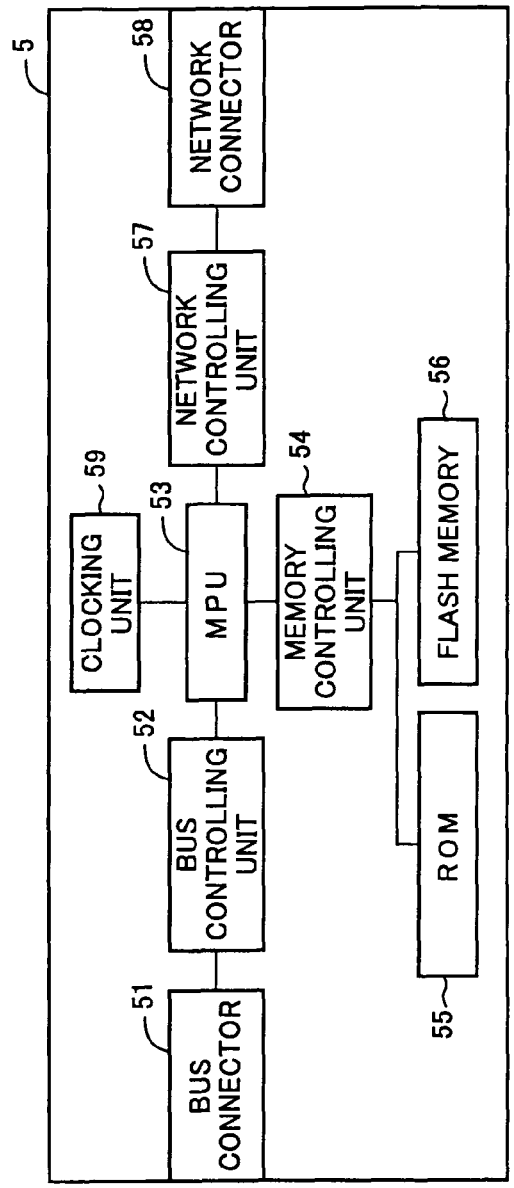
FIG. 2 is a block diagram of an outline configuration of a NIC included in the image processing apparatus X.

FIG. 2 is a block diagram of an outline configuration of the NIC included in the image processing apparatus X. The configuration of the NIC 5 will be described with reference to the block diagram shown in this FIG. 2.

The NIC 5 includes a bus connector 51, a bus controlling unit 52, an MPU 53, a memory controlling unit 54, a ROM 55, a flash memory 56, a network controlling unit 57, a network connector 58, a clocking unit 59, etc.

The bus connector 51 is a connector connected to the bus 11, and the bus controlling unit 52 performs signal transfer to/from other devices through the bus 11.

The network connector 58 is a connector physically connected to the network 30, and the network controlling unit 57 controls communication compliant with a predetermined network protocol, for example, the IEEE 802.3 standard and TCP/IP.

The MPU 53 is a calculating unit that executes programs preliminarily stored in the ROM 55 to perform various processes such as a process of relaying the signal transfer between the bus 11 and the network 30 and a process of responding to a request when a predetermined process is requested from the external apparatus 31 through the network 30. The executed programs are deployed and executed on a RAM not shown, which is built into the MPU 53. The MPU 53 accesses the ROM 55 and the flash memory 56 through the memory controlling unit 54.

The clocking unit 59 includes a clock generator that generates a transmission signal at a constant frequency and clocks the current time and a time set by the MPU 53 (hereinafter, timer setting time) based on the transmission signal. The MPU 53 receives the information of the current time clocked by the clocking unit 59 and the information indicating that the timer setting time has elapsed from the time point when the timer setting time was set.

Figure 3:
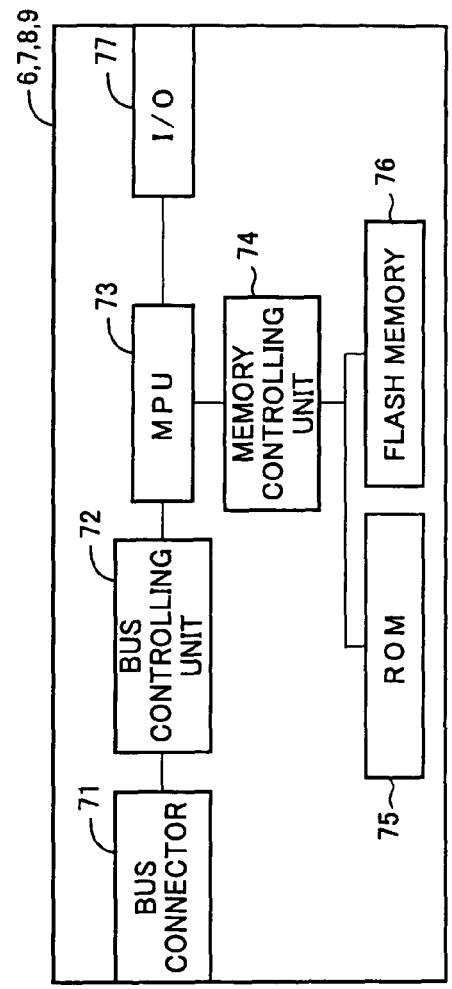
FIG. 3 is a block diagram of an outline configuration of a controlling unit included in the image processing apparatus X.

FIG. 3 is a block diagram of an outline configuration of a controlling unit included in the image processing apparatus X. The configurations of the main controlling unit 9 and the local controlling units 6 to 8 will be described with reference to the block diagram shown in this FIG. 3. The main controlling unit 9 and the local controlling units 6 to 8 are hereinafter generally referred to as controlling units.

The controlling unit 6 to 9 includes a bus connector 71, a bus controlling unit 72, an MPU 73, a memory controlling unit 74, a ROM 75, a flash memory 76, an I/O port 77, etc.

The bus connector 71, the bus controlling unit 72, the memory controlling unit 74, the ROM 75 and the flash memory 76 includes the same functions as the bus connector 51, the bus controlling unit 52, the memory controlling unit 54, the ROM 55 and the flash memory 56 included in the NIC 5, respectively. Of course, the contents of programs and data stored in the ROM 75 and the flash memory 76 are different from those stored in the ROM 55 and the flash memory 56 of the NIC 5.

The I/O port 77 of the controlling unit 6 to 9 is connected to a signal line transmitting the control signal output from the controlling units 6 to 9 to the device to be controlled and a signal line transmitting various detection signals input from various sensors to the controlling units 6 to 9 and is an interface relaying between the signal lines and the MPU 73.

For example, the I/O port 77 of the main controlling unit 9 is connected to the signal lines leading to the devices and the sensors configuring the operating unit 1, the displaying unit 2, and the HDD 3. The I/O port 77 of the scanner controlling unit 6 is connected to the signal lines leading to devices such as the motor, the light source, and the sensor configuring the scanner unit 6a, and the I/O port 77 of the print controlling unit 7 is connected to the signal lines leading to the devices such as the motor, the sensor, and the heater included in the printing unit 7a. Similarly, the I/O port 77 of the post-process controlling unit 8 is connected to the signal lines leading to the devices and the sensors included in the post-process executing units 8a to 8c.

Although the flash memory 56, 76 is disposed as a non-volatile storage means that allows the MPU 53, 73 to write or read out data in FIGS. 2 and 3, other nonvolatile storage means such as EEPROM may be employed instead of the flash memory 56, 76.

[Power Source System]

Figure 4:
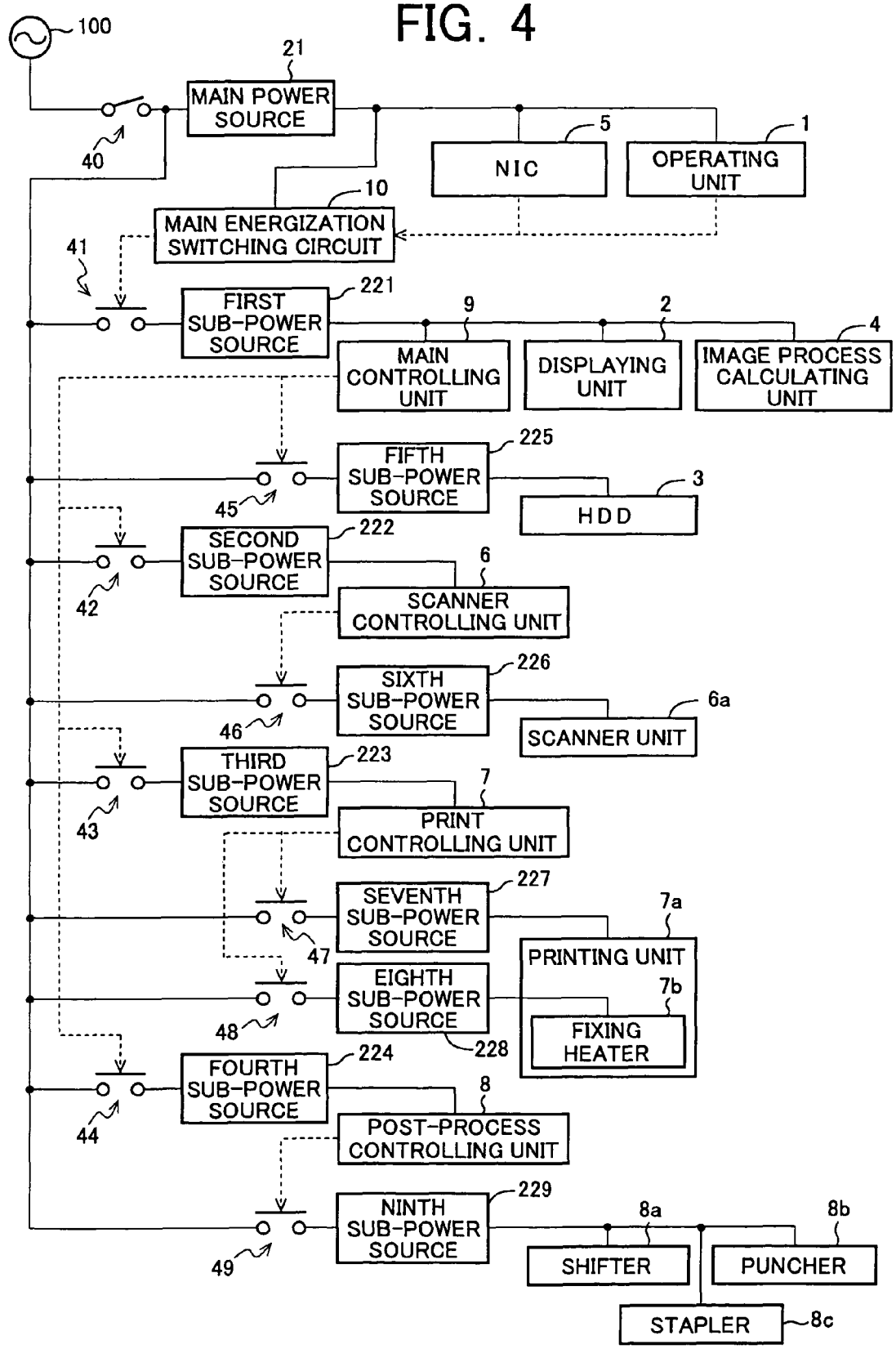
FIG. 4 is a power source system diagram of a first embodiment of power-source connection relationships in the image processing apparatus X.

FIG. 4 is a power source system diagram of a first embodiment of power-source connection relationships in the image processing apparatus X. The first embodiment of the power-source connection relationship with each functional block will be described with reference to the power source system diagram shown in this FIG. 4.

In the example shown in FIG. 4, the image processing apparatus X includes the nine sub-power sources 22. Each sub-power source is hereinafter referred to as a first sub-power source 221 to ninth sub-power source 229.

The main power source 21 is a power source that supplies electric power to the NIC 5, the operating unit 1, and the main energization switching circuit 10.

The main power source 21 is connected to a commercial power source 100, which is a root power source for the entire image processing apparatus X, through a manual changeover switch 40 that switches whether to make power supply lines to be electrically continuous or to disconnect them depending on manual operation. Whether the NIC 5, the operating unit 1 and the main energization switching circuit 10 are energized is switched by a user performing the switching operation of the manual changeover switch 40. Therefore, when the image processing apparatus X is connected to the commercial power source 100, the NIC 5, the operating unit 1 and the main energization switching circuit 10 are always energized unless the manual changeover switch 40 is switched by the user operation from a conduction (continuous) state to a disconnected state. If the manual changeover switch 40 is switched to the disconnected state, the entire image processing apparatus X becomes the non-energized state (stop state).

In FIG. 4, the power supply lines are depicted by solid lines and other signal transmission lines are depicted by dotted lines.

On the other hand, the first sub-power source 221 is a power source circuit that supplies power to the main controlling unit 9, the displaying unit 2 and image process calculating unit 4.

The second sub-power source 222, the third sub-power source 223 and the fourth sub-power source 224 are power source circuits that supply power to the scanner controlling unit 6, the print controlling unit 7 and the post-process controlling unit 8, respectively.

The fifth sub-power source 225, the sixth sub-power source 226 and the ninth sub-power source 229 are power source circuits that supply power to the HDD 3, the scanner unit 6a and the post-process executing units 8a to 8c, respectively.

The seventh sub-power source 227 is a power source circuit that supplies power to the devices of the printing unit 7a except the fixing heater 7b, and the eighth sub-power source 228 is a power source circuit that supplies power to the fixing heater 7b.

The first sub-power source 221 to the ninth sub-power source 229 are connected to the commercial power source 100 through the manual changeover switch 40 and automatic changeover switches 41 to 49 that switch whether to make the power supply lines to be electrically continuous or to disconnect them based on predetermined control signals. As is clear from FIG. 4, correlations exist between the automatic changeover switch 41 and the first sub-power source 221, between the automatic changeover switch 42 and the second sub-power source 222, . . . , and between the automatic changeover switch 49 and the ninth sub-power source 229.

Therefore, the sub-power sources 221 to 229 become an energized state only when the automatic changeover switches 41 to 49 become the conduction state if the manual changeover switch 40 has been the conduction state.

Making the power supply line to be electrically continuous and disconnecting it are hereinafter referred to as turning on and turning off, respectively. Similarly, a state where the power supply line is electrically continuous and a state where it is disconnected are referred to as on-state and off-state, respectively.

The automatic changeover switch 41 to 49 functions as an energization switching means that becomes on-state or off-state to switch whether each function block 6 to 10, 6a, 7a, 8a to 8c is individually energized.

As shown in FIG. 4, the automatic changeover switch 41 is controlled to be turned on or off (hereinafter, described as on/off) by the main energization switching circuit 10 that operates in accordance with the control signal from the NIC 5. That is, the energization of the main controlling unit 9, the displaying unit 2 and the image process calculating unit 4 is controlled by controlling on/off of the automatic changeover switch 41 with the main energization switching circuit 10 and the NIC 5 controlling the main energization switching circuit 10. Thus, the NIC 5 also acts as a medium that performs the energization control for the functional blocks. Among the components of the NIC 5, the portion realizing the control function of the main energization switching circuit 10 (specifically, the MPU 53, and a program module relating to the control of the main energization switching circuit 10 performed by the MPU 53) is hereinafter referred to as a first energization control executing unit.

Among a plurality of the automatic changeover switches 41 to 49 (corresponding to the energization switching means), the first energization control executing unit of the NIC 5 controls only the automatic changeover switch 41 that switches the energization of the main controlling unit 9, which is the highest function block (an example of a first energization controlling means). The first energization control executing unit of the NIC 5 outputs a control signal to the main energization switching circuit 10 through the bus 11.

The automatic changeover switches 42 to 45 are turned on/off under the control of the main controlling unit 9. That is, the main controlling unit 9 controls the energization of each of the scanner controlling unit 6, the print controlling unit 7, the post-process controlling unit 8 and the HDD 3, which are the function blocks one-order lower than the main controlling unit 9.

The automatic changeover switch 46, the automatic changeover switches 47, 48 and the automatic changeover switch 49 are turned on/off under the control of the scanner controlling unit 6, the print controlling unit 7 and the post-process controlling unit 8, respectively. That is, the scanner controlling unit 6 controls the energization of the scanner unit 6a, which is the function block one-order lower than the scanner controlling unit 6. Similarly, the print controlling unit 7 controls the energization of the printing unit 7a, which is the function block one-order lower than the print controlling unit 7. The post-process controlling unit 8 controls the energization of the post-process executing units 8a to 8c, which are the function blocks one-order lower than the post-process controlling unit 8. Each controlling unit 6 to 9 outputs the control signal to the automatic changeover switches 42 to 49 through the I/O port 77 thereof, and the process of outputting the control signal is achieved by executing a predetermined program with the MPU 73 included in each controlling unit 6 to 9. Among the components of each controlling unit 6 to 9, the portion realizing the control function of the automatic changeover switches 42 to 49 (specifically, the MPU 73, and a program module relating to the control of the automatic changeover switches 42 to 49 performed by the MPU 73) is hereinafter referred to as a second energization control executing unit.

Among a plurality of the automatic changeover switches 41 to 49 (corresponding to the energization switching means), the second energization control executing unit of each controlling unit 6 to 9 controls only the switch that switches the energization of another function block, which is one-order lower than the own function block (relevant function block) (an example of a second energization controlling means).

The basic operation of the energization control of the function blocks will be described.

First, description will be made of the basic operation of starting the energization of the function blocks when the function blocks are not energized. A "non-energized state" hereinafter indicates a state where a function block is not energized and an "energized state" indicates a state where a function block is energized.

[Basic Operation of Starting Energization]

To switch the function blocks from the "non-energized state" to the "energized state", the automatic changeover switch 41 is switched from off-state to on-state by the first energization control executing unit in the NIC 5 and the main energization switching circuit 10. As a result, the state of energization is switched from the "non-energized state" to the "energized state" in the main controlling unit 9, which is the highest function block.

When the main controlling unit 9 becomes the "energized state", the second energization control executing unit in the main controlling unit 9 switches the off-state to the on-state in the switches corresponding to the function blocks (needed to be energized) that are one-order lower than the main controlling unit 9 among the automatic changeover switches 42 to 45. As a result, the function blocks one-order lower than the main controlling unit 9 (one or more of the HDD 3 and the local controlling units 6 to 8) are switched to the "energized state".

When the local controlling unit 6 to 8 becomes the "energized state", the second energization control executing unit in the local controlling unit 6 to 8 switches the off-state to the on-state in the switches corresponding to the function blocks (needed to be energized) that are one-order lower than the local controlling unit among the automatic changeover switches 46 to 49. As a result, the function blocks one-order lower than the local controlling units 6 to 8 (one or more of the scanner unit 6a, the printing unit 7a, and the post-process executing units 8a to 8c) are switched to the "energized state".

Due to the effects of the first energization control executing unit in the NIC 5, the main energization switching circuit 10, and the second energization control executing unit in the controlling unit 6 to 9, when the function blocks are switched from the "non-energized state" to the "energized state", the image processing apparatus X performs a hierarchical energization controlling process of switching the energization state of each function block such that the function blocks are switched to the "energized state" in the order from higher to lower blocks.

[Basic Operation of Terminating Energization]

Description will then be made of the basic operation of terminating the energization of the function blocks when the function blocks are in the "energized state".

If the first energization control executing unit of the NIC 5 switches the control target, i.e., the main controlling unit 9 from the "energized state" to the "non-energized state", the first energization control executing unit confirms the "non-energized state" of all of the local controlling units 6 to 8, which are the function blocks lower than the main controlling unit 9, and the scanner unit 6a, the printing unit 7a and the post-process executing units 8a to 8c, which are the further lower function blocks, and switches the automatic changeover switch 41 from on-state to off-state only when the "non-energized state" can be confirmed. That is, if the "non-energized state" cannot be confirmed, the automatic changeover switch 41 is prohibited from being switched from on-state to off-state.

If the second energization control executing unit of the main controlling unit 9 switches the control target, which is the scanner controlling unit 6, from the "energized state" to the "non-energized state", the second energization control executing unit confirms the "non-energized state" of the scanner unit 6a, i.e., any function block lower than the scanner controlling unit 6 and switches the automatic changeover switch 42 from on-state to off-state only when the "non-energized state" can be confirmed. That is, if the "non-energized state" cannot be confirmed, the automatic changeover switch 42 is prohibited from being switched from on-state to off-state.

Similarly, if the second energization control executing unit of the main controlling unit 9 switches the control target, which is the print controlling unit 7 or the post-process controlling unit 8, from the "energized state" to the "non-energized state", the second energization control executing unit confirms the "non-energized state" of the printing unit 7a or the post-process executing units 8a to 8c, i.e., any function block lower than the print controlling unit 7 or the post-process controlling unit 8 and switches the automatic changeover switch 43 or 44 from on-state to off-state only when the "non-energized state" can be confirmed. That is, if the "non-energized state" cannot be confirmed, the automatic changeover switch 43 or 44 is prohibited from being switched from on-state to off-state.

As shown above, the first energization control executing unit of the NIC 5 and the second energization control executing unit of the main controlling unit 9 (those having any function block lower than the function block that is the target of the energization control) perform the process of switching the control target, i.e., the one-order lower function block to the "non-energized state" only when it is confirmed that the further lower function blocks are in the "non-energized state". Therefore, an unsafe situation can certainly be prevented where the function blocks on a controlling side, i.e., the local controlling units 6 to 8 are switched to the "non-energized state" before switching the function blocks on a controlled side, i.e., the scanner unit 6a, the printing unit 7a, and the post-process executing units 8a to 8c.

In a method of confirming the energization state of the function block lower than the function block that is the target of the energization control, for example, the control target function block in the "energized state" may be queried for the energization state of the lower function block and the energization state may be confirmed based on the response to the query. Alternatively, the latest energization states of the function blocks may be stored in the flash memory 56 of the NIC 5 and the energization state of the lower function block may be checked by referring to the stored contents. In this case, each function block including the second energization control executing unit may be disposed with a function that notifies the NIC 5 of information indicating the switching of the energization state of the one-order lower function block, and the NIC 5 may be disposed with a function that stores the latest energization states of the function blocks into the flash memory 56 based on the notifications from the function blocks.

In the image processing apparatus X, if each function block is energized, for example, the NIC 5 or the main controlling unit 9 determines whether the following two conditions (hereinafter, a first sleep condition and a second sleep condition) are satisfied. If any sleep condition is satisfied, the image processing apparatus X enters the sleep mode, which is a state that the energization of the function blocks is interrupted, in accordance with the above basic operation of terminating energization. In the sleep mode, the nine automatic changeover switches 41 to 49 are all switched to "off-state", and all the function blocks supplied with power from the nine sub-power sources 221 to 229 become the "non-energized state". That is, only a portion of devices including the NIC 5 (the NIC 5, the operating unit 1, and the main energization switching circuit 10) is in the "energized state".

When entering the sleep mode, the MPU 53 of the NIC 5 records sleep-mode shifting reason information indicating which of the first and second sleep conditions is satisfied, in the flash memory 56 of the NIC 5.

[First Sleep Condition]

The first sleep condition is a condition that the current date and time belong to a time zone set to the sleep mode in a predetermined weekly schedule. Weekly timer control hereinafter means that the energization states of the function blocks are controlled by controlling the automatic changeover switches 41 to 49 in accordance with the predetermined weekly schedule.

FIG. 5 schematically depicts contents of the weekly schedule of weekly timer control. Each box in FIG. 5 is a time zone defined by a day of the week (Monday to Sunday) and an hour (00 hour zone to 23 hour zone). Empty boxes represent time zones set to the sleep mode, and boxes with "*" represent time zones set to the normal mode in which each of the function blocks is energized.

For example, the MPU 53 of the NIC 5 preliminarily stores the information of the weekly schedule shown in FIG. 5 in the flash memory 56. The first energization control executing unit of the NIC 5 periodically acquires the current time clocked by the clocking unit 59 and determines whether the time zone of the current time is set to the sleep mode or the normal mode in the weekly schedule stored in the flash memory 56. The first energization control executing unit controls the automatic changeover switch 41 through the main energization switching circuit 10 in accordance with the determination result and notifies the controlling units 6 to 9 of the energization control information through the bus 11 to allow the second energization control executing units of the controlling units 6 to 9 to control the automatic changeover switches 42 to 49. In this case, the NIC 5 is an example of a weekly timer controlling means.

The main controlling unit 9 includes a weekly schedule setting function that allows a user to set the contents of the weekly schedule by controlling the operating unit 1 and displaying unit 2. The weekly schedule set by the weekly schedule setting function is transmitted from the main controlling unit 9 to the NIC 5 and stored by the MPU 53 of the NIC 5 into the flash memory 56.

[Second Sleep Condition]

The second sleep condition is a condition that no operation is input through the operating unit 1 and no data are received from the external apparatus 31 through the network 30 for a predetermined time period or more when the first sleep condition is not satisfied.

For example, if the NIC 5 determines whether the second sleep condition is satisfied, the first energization control executing unit of the NIC 5 detects through the main energization switching circuit 10 whether operation is input to the operating unit 1 and detects through the network controlling unit 57 whether data are received from the external apparatus 31. In this case, every time any operation is input to the operating unit 1, a control signal indicating the input is transmitted from the operating unit 1 to the main energization switching circuit 10 through the signal line connecting the operating unit 1 and the main energization switching circuit 10 and is transmitted from the main energization switching circuit 10 to the NIC 5 through the bus 11.

The first energization control executing unit of the NIC 5 sets the timer setting time in the clocking unit 59 and acquires the response from the clocking unit 59 to detect that no operation is input through the operating unit 1 and no data are received from the external apparatus 31 through the network 30 for a predetermined time period or more. The first energization control executing unit controls the automatic changeover switch 41 through the main energization switching circuit 10 in accordance with the detection result and notifies the controlling units 6 to 9 of the energization control information through the bus 11 to allow the second energization control executing units of the controlling units 6 to 9 to control the automatic changeover switches 42 to 49.

Figure 6:
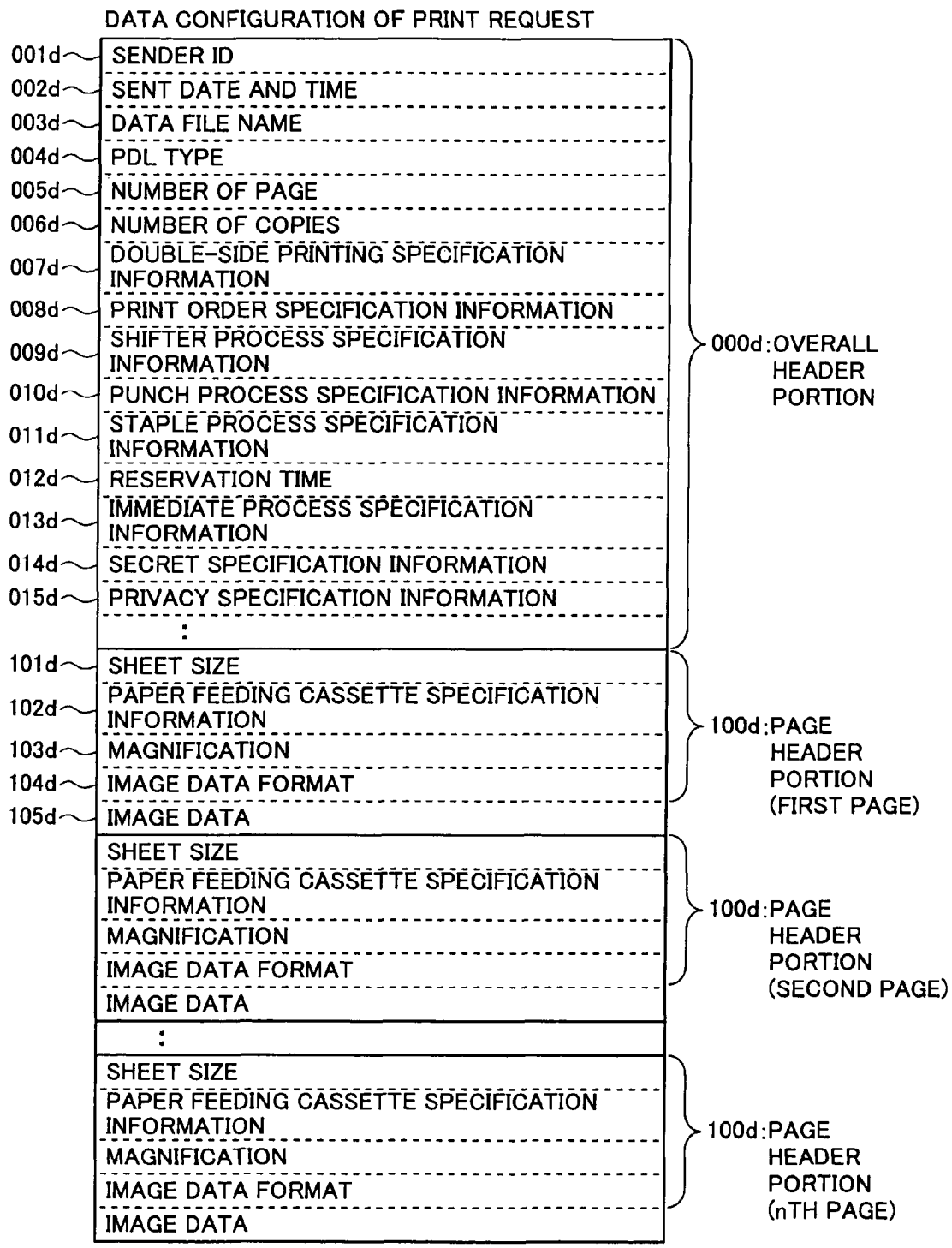
FIG. 6 depicts a data configuration of a print request that is an example of a data processing request to the image processing apparatus X.

FIG. 6 depicts a data configuration of the print request that is an example of the data processing request to the image processing apparatus X. Description will be made of contents of the data processing request received by the NIC 5 from the external apparatus 31 through the network 30 with reference to this FIG. 6.

As shown in FIG. 6, the print request includes an overall header portion 000d that sets various pieces of information relating to the overall print request, a page header portion 100d that sets various pieces of information relating to a print page for each print page, and image data 105d (image data that are target of image formation) for each print page.

The overall header portion 00d includes, for example, the following information relating to the print request:

(1) sender ID 001d, which is identification information of a sender (a user of the external apparatus 31 that becomes a source);
(2) sent date and time 002d;
(3) data file name 003d representing a name of a data file that is the source of the print request generated in the external apparatus 31 (e.g., a name of a data file that is a source of a print job generated by execution of a print process in word-processing software or spreadsheet software);
(4) page-description language (PDL) type 004d (such as PCL, ESC/P, and GDI) used to express the print request;
(5) number of pages 005d to be printed;
(6) number of copies 006d;
(7) double-side printing specification information 007d representing whether printing is performed on one side or both sides of recording paper sheets;
(8) print order specification information 008d specifying in what order a plurality of pages will be printed;
(9) shifter process specification information 009d specifying details of a sorting process if the recording paper sheet sorting process by the shifter 8a is requested;
(10) punch process specification information 010d specifying whether a punching process by the puncher 8b is performed;
(11) staple process specification information 011d specifying whether a staple process by the stapler 8c is performed;

(12) reservation time 012*d* specifying a clock time when the image processing process is performed based on the print request;

(13) immediate process specification information 013*d* representing whether the image forming process should be performed immediately due to the print request;

(14) secret specification information 014*d* representing whether the image contents of the print request are confidential information with high confidentiality; and

(15) privacy specification information 015*d* setting information (such as user ID) of a certain user if it is requested that the image forming process is performed based on the print request only when the certain user is successfully authenticated.

The page header portion 100*d* includes, for example, the following information relating to each print page:

(1) sheet size 101*d* of the recording paper sheets to which an image is output;

(2) paper feeding cassette specification information 102*d* specifying a paper feeding cassette that supplies the recording paper sheets to which an image is output;

(3) magnification 103*d* representing a rate of reduction or enlargement of an image; and (4) format 104*d* (such as bitmap, JPEG, and TIF formats) of image data that are a target of image formation.

As above, a print request includes various pieces of information relating to the print request. Although an example of contents of a print request has been shown, other data processing requests (scan request, data filing request) include the similar information corresponding to each request.

A process of shifting the image processing apparatus X from the sleep mode to the normal mode (hereinafter, a sleep mode canceling process) will be described.

[Sleep Mode Canceling Process in Response to Operation Input]

During the sleep mode, the image processing apparatus X performs the sleep mode canceling process in response to the operation input to the operating unit 1.

Specifically, if any operation is input to the operating unit 1 during the sleep mode, the control signal representing the input is transmitted from the operating unit 1 to the main energization switching circuit 10, and the main energization switching circuit 10 switches the automatic changeover switch 41 to "ON".

And then, the second energization control executing unit of the main controlling unit 9 controls the automatic changeover switches 42 to 45 in accordance with the content of the operation input to the operating unit 1 and controls the local controlling units 6 to 8, which are in the "energized state", to switch the necessary function blocks to the "energized state".

[Sleep Mode Canceling Process in Response to Data Reception]

If a data processing request is received by the NIC 5 from the external apparatus 31 during the sleep mode, the image processing apparatus X performs the sleep mode canceling process (the control of starting energization of the function blocks) by controlling the automatic changeover switches 41 to 49 based on the contents of the data processing request with the first energization control executing unit of NIC 5 and the second energization control executing units of the respective controlling units 6 to 9, which are in the "energized state".

Figure 7:
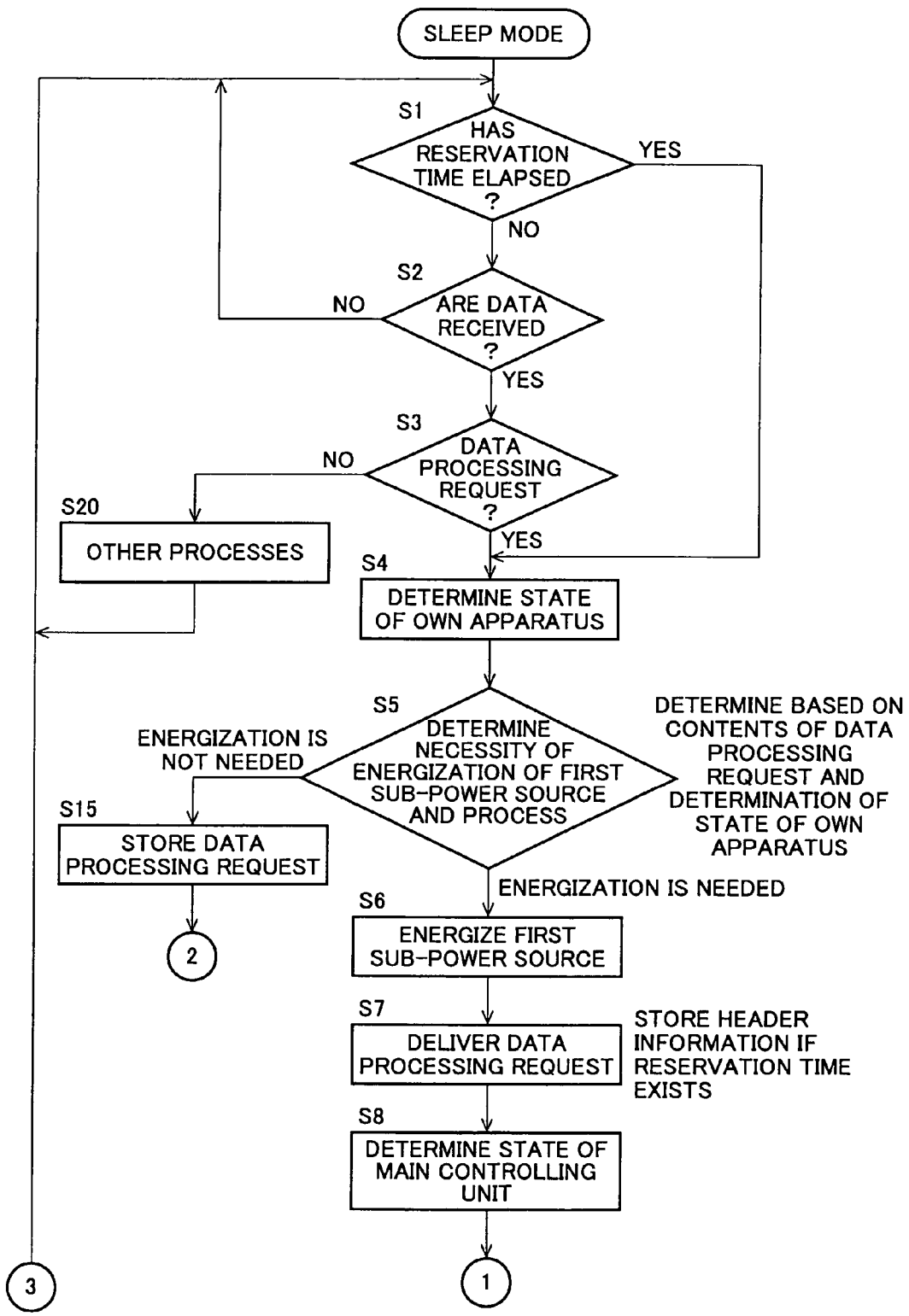
FIG. 7 is a flowchart of a part of a procedure of a sleep-mode canceling process in response to data reception in the image processing apparatus X.
Figure 8:
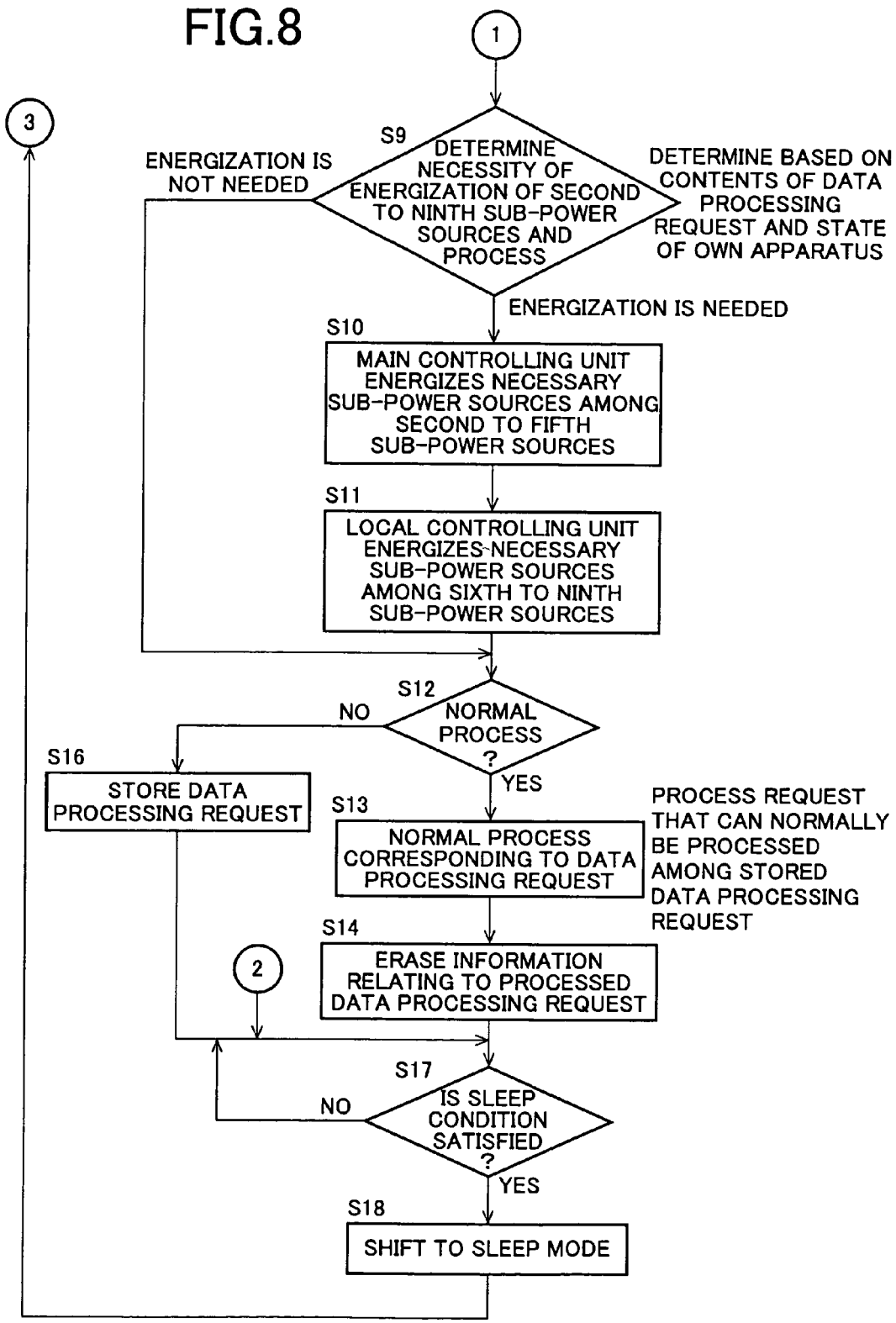
FIG. 8 is a flowchart of the rest of the procedure of the sleep-mode canceling process in response to the data reception in the image processing apparatus X.

FIGS. 7 and 8 are flowcharts of a procedure of the sleep-mode canceling process in response to the data reception in the image processing apparatus X. The procedure of the sleep mode canceling process in response to the data reception of the NIC 5 will hereinafter be described with reference to flowcharts of these FIGS. 7 and 8. S1, S2, etc., shown below are identification symbols of the process procedure (steps)

[Steps S1 and S2]

If the flash memory 56 of the NIC 5 temporarily stores a data processing request that is previously received from the external apparatus 31 through the network 30 after shifting to the sleep mode until now, when the reservation time 012*d* is set in the data processing request, the first energization control executing unit of the NIC 5 determines whether the current date and time acquired from the clocking unit 59 has passed the reservation time 012*d* (S1). The process of temporarily storing the data processing request in the flash memory 56 of the NIC 5 will be described later.

The first energization control executing unit of the NIC 5 also determines whether new data are received from the external apparatus 31 through the network 30 (S2). The first energization control executing unit of the NIC 5 repeats the process of steps S1 and S2 until the current date and time passes the reservation time 012*d* or new data are received from the external apparatus 31. With regard to the data processing request determined that the current date and time has passed the reservation time 012*d* at step S1 (the data processing request stored in the flash memory 56), the image processing apparatus X subsequently considers and processes the request as a data processing request newly received through the network 30.

[Steps S3, S4, and S20]

If it is determined that new data are received from the external apparatus 31, the first energization control executing unit of the NIC 5 determines whether the received data are the data processing request (S3). If it is determined that the new data are not the data processing request, a predetermined process ("other processes" in FIG. 7) corresponding to the contents of the data is performed (S20) and then the process is returned to above step S1.

On the other hand, if it is determines that the new received data are the data processing request (Y at S3) or that the current date and time has passed the reservation time 012*d*(Y at S1), the first energization control executing unit of the NIC 5 performs a process of determining a current state of the own apparatus (the image processing apparatus X) (S4).

For example, the first energization control executing unit of the NIC 5 determines an available capacity of the flash memory 56 of the NIC 5, which of the first and second sleep conditions is satisfied when shifting to the current sleep mode (reason for shifting to the sleep mode), the number of the data processing requests retained in the flash memory 56 of the NIC 5, etc., as the current state of the own apparatus. The first energization control executing unit of the NIC 5 determines the sleep condition that is the reason for shifting to the sleep mode, based on the sleep-mode shifting reason information stored in the flash memory 56 of the NIC 5.

An example of the control state of the weekly timer controlling means is a state that the shifting to the current sleep mode is done because the first sleep condition is satisfied, i.e., a state that the shifting to the current sleep mode is done due to the weekly timer control.

[Step S5]

The first energization control executing unit of the NIC 5 determines necessity of energization of the first sub-power source 221 (i.e., necessity of energization of the main controlling unit 9, the displaying unit 2, and the image process calculating unit 4) and a process to be executed, in accordance with a predetermined power source control rule based on the contents of the data processing request (see FIG. 6) received during the sleep mode and the state of the image processing apparatus X determined at step S4 (an example of the state of the image processing apparatus X when the data processing request is received) (S5).

FIG. 9 depicts an example of the power source control rule in the first energization control executing unit of the NIC 5.

In the power source control rule illustrated in FIG. 9, the following items are set as items of the state of the own apparatus, which may be targets of the determination. These items are items determined by the first energization control executing unit of the NIC 5 in the process at step S4:

(1) a sleep condition causing shifting to the sleep mode 201d;
(2) an available capacity of the flash memory 56 of the NIC 5 202d; and
(3) the number of the data processing request retained in the flash memory 56 of the NIC 5 203d.

The following items are set as items of the contents of the data processing request, which may be targets of the determination. The first energization control executing unit of the NIC 5 refers to the contents of the overall header portion 000d and the page header portion 100d included in the data processing request to determine these items and performs the energization control based on the determination result.

(1) Authority of sender 301d
With regard to this item, the target of the determination is the authority of the sender of the data processing request. The first energization control executing unit of the NIC 5 determines whether the sender is a normal user or a super user who has a greater authority, based on the sender ID 001d included in the data processing request and the user information preliminarily stored in the flash memory 56 of the NIC 5.
(2) Format 302d of image data in print request (corresponding to the image data format 104d of FIG. 6)
(3) Page-description language 303d of print request (corresponding to the PDL type 004d of FIG. 6)
(4) Privacy specification 304d of privacy specification information 015d (specified or not)
(5) Post-process specification 305d by print request (whether one or more of the shifter process, the punch process and the staple process are specified by the shifter process specification information 009d, the punch process specification information 010d and the staple process specification information 011d)
(6) Reservation time 012d specification 306d (whether execution of data processing is reserved by the request)
(7) Immediate process specification 307d (whether immediate process is specified by the immediate process specification information 013d)
(8) Secret information specification 308d of secret specification information 014d (specified or not)
(9) Size of process target data 309d included in the data processing request (the process target data are a size of image data that are a target of image formation in the case of the print request and a data file to be written into the HDD 3 in the case of the data filing request)
(10) File format 310d of the process target data (in the case of the print request, a file format determined by an extension (such as "TXT", "DOC") of the data file name 003d) (11) Data processing request type 311d (any one of the print request, the scan request, and the data filing request)

In the power source control rule illustrated in FIG. 9, rule numbers 401d (R1, R2, ...), energization states 402d (on/off) of the first sub-power source 221, and processes to be executed 403d are set for each unit rule (each column of FIG. 9 represents a unit rule), which is a combination formed in accordance with an AND condition from the contents of the items 201d to 203d relating to the state of the image processing apparatus X and the contents of the items 301d to 311d relating to the contents of the data processing request.

The combination of the energization state 402d of the first sub-power source 221 and the process to be executed 403d has two patterns; in one pattern, the first sub-power source 221 is not energized (OFF) and the received data processing request is recorded in the flash memory of the NIC 5 (which is denoted by "H" in FIG. 9); and in the other pattern, the first sub-power source 221 is energized (ON) and the received data processing request is delivered to the main controlling unit 9 through the bus 11 (which is denoted by "I" in FIG. 9).

In FIG. 9, if no content is set in an item of the unit rule (if a box is blank), this represents that the content of the item is not referenced.

The first energization control executing unit of the NIC 5 determines whether each unit rule condition is satisfied in the order of the rule numbers 401d (order of R1, R2, ..., Rn) and determines the necessity of energization of the first sub-power source 221 in accordance with the energization state 402d of the first sub-power source 221 corresponding to the unit rule having a condition satisfied first.

The main controlling unit 9 includes a power source control rule setting function that controls the operating unit 1 and the displaying unit 2 to allow a user to set some or all of the unit rules. The power source control rule set by this power source control rule setting function is transmitted from the main controlling unit 9 to the NIC 5 and stored by the MPU 53 of the NIC 5 into the flash memory 56.

In the power source control rule illustrated in FIG. 9, if the sleep condition causing shifting to the sleep mode 201d is the second sleep condition (continuation of the no-input state), if the available capacity of the flash memory 56 of the NIC 5 202d is a predetermined size or more, if the authority of sender 301d is the "super user", if the reservation time specification 306d is "YES", if the secret specification 308d is "NO", and if the size of process target data 309d is less than a predetermined size, the first energization control executing unit of the NIC 5 determines that the first sub-power source 221 is not energized and that the received data processing request should be recorded in the flash memory 56 of the NIC 5 (rule No. R1).

Otherwise, if the sleep condition 201d is the second sleep condition, if the available capacity of the flash memory 56 of the NIC 5 202d is a predetermined size or more, if the number of the data processing requests already retained in the flash memory 56 of the NIC is less than a predetermined number, if the authority of sender 301d is the "normal user", if the immediate process specification 307d is "NO", if the secret specification 308d is "NO", and if the size of process target data 309d is less than a predetermined size, the first energization control executing unit of the NIC 5 determines that the first sub-power source 221 is not energized and that the received data processing request should be recorded in the flash memory 56 of the NIC 5 (rule No. R2).

Otherwise, if the sleep condition 201d is the first sleep condition (weekly timer control), if the number of the data processing requests already retained in the flash memory 56 of the NIC 5 is less than a predetermined number, if the authority of sender 301d is the "normal user", if the page-description language 303d is "ECS/P" or "PCL", if the secret specification 308d is "NO", and if the data processing request type 311d is the "print request", the first energization control executing unit of the NIC 5 determines that the first sub-power source 221 is not energized and that the received data processing request should be recorded in the flash memory 56 of the NIC 5 (rule No. R3).

Otherwise, if the sleep condition 201d is the first sleep condition, if the number of the data processing requests already retained in the flash memory 56 of the NIC 5 is less than a predetermined number, if the authority of sender 301d is the "normal user", if the secret specification 308d is "NO", if the file format 310d of process target data is "TXT" (text data), and if the data processing request type 311d is the "print request" or "data filing request", the first energization control executing unit of the NIC 5 determines that the first sub-power source 221 is not energized and that the received data processing request should be recorded in the flash memory 56 of the NIC 5 (rule No. R4).

Otherwise, the first energization control executing unit of the NIC 5 determines that the first sub-power source 221 is energized and that the received data processing request should be delivered to the main controlling unit 9 (rule No. R5).

[Steps S15, S6, S7, and S8]

Referring back to the flowcharts in FIGS. 7 and 8, the procedure of the sleep mode canceling process will be described further. If it is determined at step S5 that no energization is needed for the first sub-power source 221, the first energization control executing unit of the NIC 5 stores the received data processing request in the flash memory 56 of the NIC 5 (S15) and the process is shifted to step S17 described later. The data processing request stored in the flash memory 56 at step S15 is the data processing request that may be checked for the reservation time 012d at above step S1.

On the other hand, if it is determined at step S5 that the energization of the first sub-power source 221 is needed, the first energization control executing unit of the NIC 5 turns on the automatic changeover switch 41 through the main energization switching circuit 10 to energize the first sub-power source 221 (S6). As a result, the main controlling unit 9, the displaying unit 2 and the image process calculating unit 4 become the "energized state".

The first energization control executing unit of the NIC 5 delivers the received data processing request and the state of the own apparatus, which is a result of determination at step S4, to the main controlling unit 9 in the "energized state" (S7). If the reservation time 012d is set in the data processing request, the first energization control executing unit of the NIC 5 stores the overall header portion 000d included in the data processing request into the flash memory 56 of the NIC 5 (S7). As a result, the flash memory 56 of the NIC 5 stores the reservation time 012d and information (such as the sender ID 001d and the sent date and time 002d) that can be used to identify the data processing request.

[Steps S8 and S9]

The second energization control executing unit of the main controlling unit 9 receives the delivery of the data processing request and performs a process of determining a current state of the main controlling unit 9 at this point (S8) For example, the second energization control executing unit of the main controlling unit 9 determines an available capacity of the flash memory 76 of the main controlling unit 9, etc.

The second energization control executing unit of the main controlling unit 9 determines necessity of energization of the second sub-power source 222 to the ninth sub-power source 229 (i.e., necessity of energization of each of the local controlling units 6 to 8, the HDD 3, the scanner unit 6a, the printing unit 7a, and the post-process executing units 8a to 8c) and a process to be executed, in accordance with a predetermined power source control rule based on the contents of the data processing request delivered from the NIC 5 (i.e., the data processing request received during the sleep mode) and the current state of the own apparatus (including the determination result at step S4 and the determination result at step S8) (S9).

The second energization control executing unit of the main controlling unit 9 also refers to the contents of the overall header portion 000d and the page header portion 100d included in the data processing request to determine the same items as those determined by the first energization control executing unit of the NIC 5 and performs the energization control based on the determination results.

FIG. 10 depicts an example of the power source control rule in the second energization control executing unit of the main controlling unit 9.

In the power source control rule illustrated in FIG. 10, the number of data processing requests retained in the HDD 3 204d is set, in addition to the same items as the power source control rule of the NIC 5 illustrated in FIG. 9, as the items of the state of the own apparatus, which may be targets of the determination, and the items of the contents of the data processing request. This information is stored in the flash memory 76 of the main controlling unit 9 by a process of step S16 described later when the data processing request is recorded in the HDD 3. With regard to the available capacity of the flash memory 202d and the number of the data processing requests retained in the flash memory 203d among the items of the state of the own apparatus, the target flash memory is the flash memory 76 of the main controlling unit 9. The unit rules, the rule numbers 401d, the reference order of the unit rules, etc., are the same as those of the power source control rule of the NIC 5 illustrated in FIG. 9.

The same unit rules as the rule numbers R1 to R4 shown in FIG. 9 are set in the power source control rule illustrated in FIG. 10.

If the unit rules of the rule numbers R1 to R4 are not applicable, if the number of data processing requests retained in the HDD 3 204d is less than a predetermined number, if the authority of sender 301d is the "normal user", if the image data format 302d of a print request is the "JPEG" or "TIF" format (i.e., other than the bitmap format), if the immediate process specification 307d is "NO", if the secret specification 308d is "NO", and if the data processing request type 311d is the "print request", the second energization control executing unit of the main controlling unit 9 determines that only the fifth sub-power source 225 is energized which is the power source of the HDD 3 and that the received data processing request should be recorded in the HDD 3 (rule No. R5).

Otherwise, if the privacy specification 304d is "YES" and if the data processing request type 311d is the "print request", the second energization control executing unit of the main controlling unit 9 determines that only the fifth sub-power source 225 is energized which is the power source of the HDD 3 and that the received data processing request should be recorded in the HDD 3 (rule No. R6).

Otherwise, if the post-process specification 305d is "YES" and if the data processing request type 311d is the "print request", the second energization control executing unit of the main controlling unit 9 determines that the third sub-power source 223 to the fifth sub-power source 225 and the seventh sub-power source 227 to the ninth sub-power source 229 are energized and that the normal process (image forming process and post-process) corresponding to the received data processing request should be performed (rule No. R7). As a result, the HDD 3, the print controlling unit 7, the printing unit 7a, the post-process controlling unit 8 and the post-process executing units 8a to 8c become the "energized state", and the image forming process and post-processes (the shifter process, the punch process and/or the staple process) corresponding to the data processing request are performed.

Otherwise, if the data processing request type 311*d* is the "print request", the second energization control executing unit of the main controlling unit 9 determines that the third sub-power source 223, the fifth sub-power source 225, the seventh sub-power source 227 and the eighth sub-power source 228 are energized and that the normal process (image forming process) corresponding to the received data processing request should be performed (rule No. R8). As a result, the HDD 3, the print controlling unit 7 and the printing unit 7*a* become the "energized state", and the image forming process corresponding to the data processing request is performed.

Otherwise, if the data processing request type 311*d* is the "scan request", the second energization control executing unit of the main controlling unit 9 determines that the second sub-power source 222, the fifth sub-power source 225 and the sixth sub-power source 226 are energized and that the normal process (document image read process) corresponding to the received data processing request should be performed (rule No. R9). As a result, the HDD 3, the scanner controlling unit 6 and the scanner unit 6*a* become the "energized state", and the image reading process corresponding to the data processing request is performed.

Otherwise, if the data processing request type 311*d* is the "data filing request", the second energization control executing unit of the main controlling unit 9 determines that only the fifth sub-power source 225 for the HDD 3 is energized and that the normal process (data filing process) corresponding to the received data processing request should be performed (rule No. R10). As a result, the HDD 3 becomes the "energized state", and the data filing process corresponding to the data processing request is performed.

The contents of the unit rules shown in FIG. 10 can be changed and added by the power source control rule setting function.

[Steps S10 and S11]

The second energization control executing unit of the main controlling unit 9 energizes the sub-power sources determined at step S9 as those needed to be energized among the second sub-power source 222 to the fifth sub-power source 225 by turning on only the corresponding automatic changeover switches 42 to 45 (S10). If it is determined that no energization is needed for the sub-power sources, the automatic changeover switches 42 to 45 are not switched and the process is shifted to step S12 described later. As a result, among the HDD 3, the scanner controlling unit 6, the print controlling unit 7 and the post-process controlling unit 8, only necessary components become the "energized state".

On the other hand, the local controlling unit 6 to 8 that is put into the "energized state" by the main controlling unit 9 energizes each corresponding sub-power source (any one of the sixth sub-power source 226 to the ninth sub-power source 229) by turning on the corresponding automatic changeover switches 46 to 49 (S11) and the process is shifted to step S12. As a result, among the scanner unit 6*a*, the printing unit 7*a* and the post-process executing units 8*a* to 8*c*, only necessary components become the "energized state".

[Steps S12 and S16]

The second energization control executing unit of the main controlling unit 9 switches the process depending on the result of the determination process at step S9 (whether the normal process corresponding to the data processing request is performed) (S12).

That is, if it is determined at step S9 that the normal process corresponding to the data processing request is not performed, the second energization control executing unit of the main controlling unit 9 stores the data processing request delivered from the NIC 5 into the flash memory 76 of the main controlling unit 9 or the HDD 3 in the "energized state" depending on the determination result of step S9 (S16) and the process is shifted to the step S17 described later. If the reservation time 012*d* is set, the overall header portion 000*d* of the data processing request stored in the flash memory 76 of the main controlling unit 9 or the HDD 3 at step S16 is stored in the flash memory 56 of the NIC 5 by the process of step S7. Therefore, the data processing request stored in the flash memory 76 of the main controlling unit 9 at step S16 is also the data processing request that may be checked for the reservation time 012*d* at above step S1.

If the data processing request is stored in the HDD 3 at step S16, the number of the data processing requests currently retained (stored) in the HDD 3 is stored in the flash memory 76 of the main controlling unit 9.

[Steps S13 and S14]

On the other hand, if it is determined at step S12 that the normal process corresponding to the data processing request is performed, since the main controlling unit 9 necessary for the process, the local controlling units 6 to 8 and the function blocks (the scanner unit 6*a*, the printing unit 7*a* and the post-process executing units 8*a* to 8*c*) controlled by the local controlling units 6 to 8 are in the "energized state", the function blocks in the "energized state" perform the normal process corresponding to the data processing request (S13). At step S13, if the flash memory 56 of the NIC 5, the flash memory 76 of the main controlling unit 9 or the HDD 3 stores the data processing request that can be processed by the function blocks that currently are in the "energized state", the process corresponding to the data processing request is also performed.

If the information relating to the data processing request (data processing request itself or header portions thereof) that was a target of the normal process at step S13 is stored (left) in the flash memory 56 of the NIC 5, the flash memory 76 of the main controlling unit 9 or the HDD 3 due to the processes of steps S7, S15 and S16, the stored information is entirely erased after the execution of the normal process. (S14).

[Steps S17 and S18]

After the processes of steps S1 to S16 are performed as above, the NIC 5 or the main controlling unit 9 determines whether the above two sleep conditions (the first sleep condition or the second sleep condition) are satisfied (S17).

If any sleep condition is satisfied, the image processing apparatus X enters the sleep mode, which is a state where the energization of each function block is interrupted, in accordance with the above basic operation of terminating energization (S18), and the process is returned to above step S1.

As shown above, the image processing apparatus X controls whether energization is individually performed for each of a plurality of the function blocks 3, 6 to 9, 6*a*, 7*a*, 8*a* to 8*c* sectionalized in accordance with the functions. The image processing apparatus X performs control such that only the required minimum function blocks become the "energized state" depending on the contents of the data processing request received from the external apparatus 31 through the NIC 5 and the state of own apparatus during the sleep mode (power-saving state). As a result, power consumption can be reduced as compared to the conventional case.

The image processing apparatus X acquires the following features by performing the energization control in accordance with the control rules illustrated in FIGS. 9 and 10.

For example, the unit rule of the rule number R2 has a necessary condition that the immediate process specification 307d is "NO" and is a rule determining that immediate execution of the data process is not requested.

Therefore, if it is determined that the contents of the data processing request received by the NIC 5 do not request immediate execution of the data process in accordance with the unit rule of the rule number R2, the first energization control executing unit of the NIC 5 and the second energization control executing unit of the main controlling unit 9 (hereinafter, collectively referred to as the energization control executing unit) perform the process of storing the data processing request to the flash memory 56 of the NIC 5 and the flash memory 76 of the main controlling unit 9 (S15, S16).

If new data processing request is subsequently received and the condition that the flash memory 56 of the NIC 5 and the flash memory 76 of the main controlling unit 9 store a predetermined number or more of the data processing requests or the condition that the remaining capacity of the flash memory storing the data processing request becomes less than a predetermined size is satisfied, the unit rule of the rule number R5 is applied instead of the unit rules of the rule number R2. If the unit rule of the rule number R5 is applied, the energization control executing unit switches the function blocks corresponding to the data processing requests stored in the flash memories 56, 76 from the "non-energized state" to the "energized state" (S10, S11), and the function blocks in the "energized state" perform the processes corresponding to the data processing requests (S13).

In this way, after accepting and storing a plurality of data processing requests in the storage means during the sleep mode, if a predetermined condition (energization start condition) is satisfied, the energization control executing unit switches the corresponding function blocks from the "non-energized state" to the "energized state" (an example of the request buffering energization controlling process). That is, the energization control executing unit controls the automatic changeover switches 41 to 49 to control which "non-energized" function block is put into the "energized state" at what timing. Therefore, since a plurality of the data processing requests stored in the storage means is processed all together, the frequency of energization is reduced in the function blocks and the power consumption is reduced in the image processing apparatus X.

In addition to the control rules illustrated in FIGS. 9 and 10, the condition allowing the energization control executing unit to start the processes corresponding to the data processing requests stored in the flash memories 56, 76 may include, for example, a condition that the total data size of the data processing requests stored in the flash memories 56, 76 becomes a predetermined size or more, a condition that a predetermined time has elapsed since the first data processing request was stored in the flash memories 56, 76, etc.

The energization control executing unit can change details of the energization control depending on the authority of the sender 301*d* of the data processing request and therefore the flexible energization control can be performed depending on the authority of the sender.

If the secret specification 308*d* of the data processing request is set to "YES", the energization control executing unit can switch the function blocks corresponding to the data processing request from the "non-energized state" to the "energized state" to switch the function blocks to a state where the data processing request can immediately be processed. As a result, since the data processing request with high confidentiality is not stored in the flash memories 56, 76 and the HDD 3 for a long time, information on the data processing request with high confidentiality can be prevented from leaking.

The energization control executing unit can perform control to switch the function blocks to the "energized state" in the order from higher to lower blocks according to the setup contents of the control rule until the image processing apparatus X becomes the state that enables the execution of the process corresponding to the contents of the data processing request received through the NIC 5.

For example, when the data processing request is a print request, if the privacy specification 304*d* of the data processing request is "YES", the energization control executing unit switches components from the highest main controlling unit 9 to the one-order lower HDD 3 to the "energized state" to store the data processing request into the HDD 3. On the other hand, if the privacy specification 304*d* is "NO", the energization control executing unit switches components from the main controlling unit 9 at highest order to the printing unit 7*a* and the post-process executing units 8*a* to 8*c* at the lowest order to the "energized state" to perform the print process. This control unit switches only the required minimum function blocks from the "non-energized state" to the "energized state" and power consumption can be reduced to a minimum.

By the way, as shown in the power source system diagram of FIG. 4, in the first embodiment of the power-source connection relationships for the function blocks, the controlling portion switching the energization state of each function block in the hierarchical energization controlling process is configured in a distributed manner as the first energization control executing unit of the NIC 5 and the second energization control executing unit of the controlling units 6 to 9.

However, in some embodiments, the hierarchical energization controlling process may be executed by performing the energization control for all the function blocks 3, 6 to 9, 6*a*, 7*a*, 8*a* to 8*c* with the NIC 5, which is energized even during the sleep mode.

Figure 11:
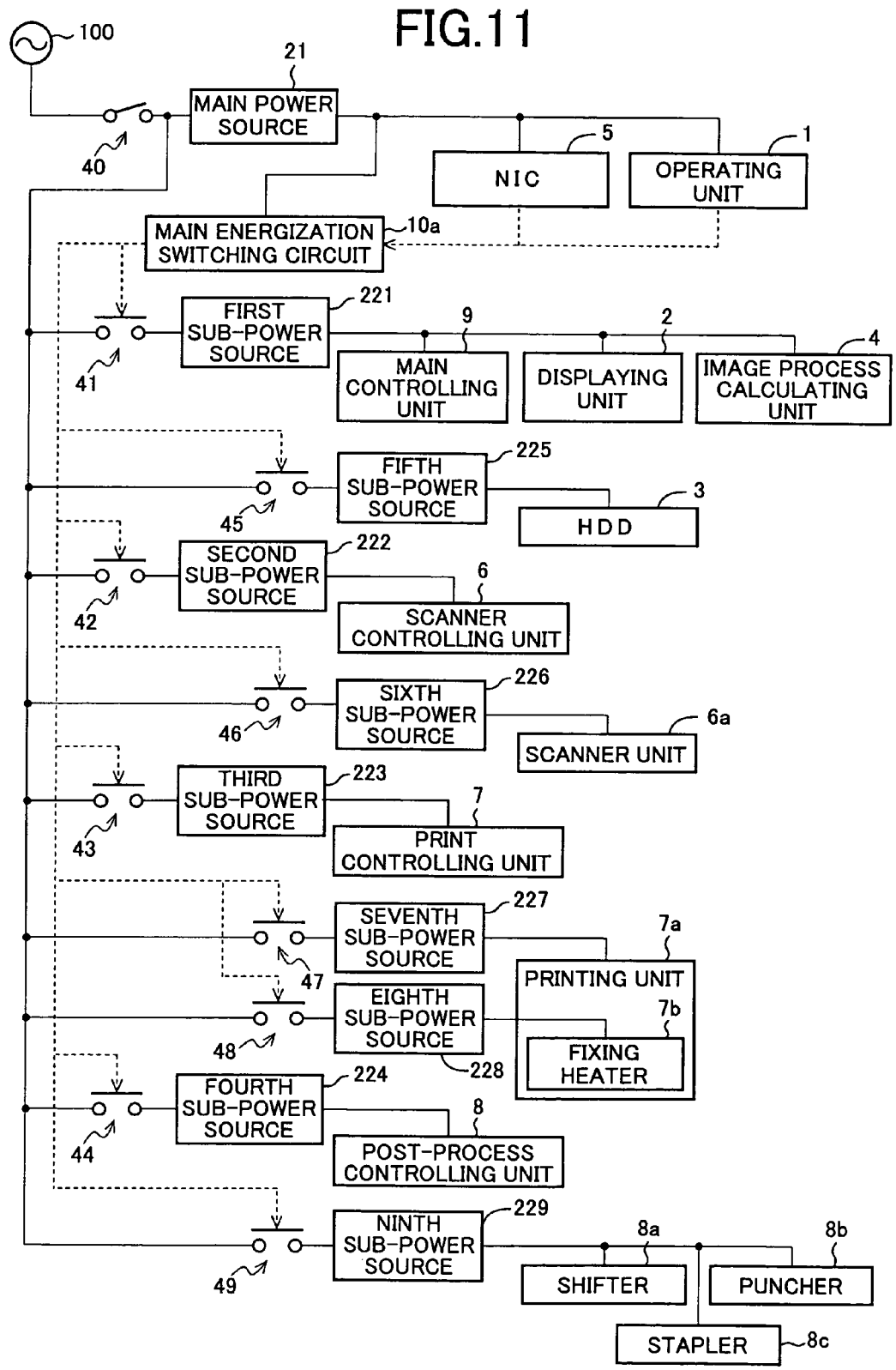
FIG. 11 is a power source system diagram of a second embodiment of power-source connection relationships in the image processing apparatus X.

FIG. 11 is a power source system diagram of a second embodiment of power-source connection relationships in the image processing apparatus X. In the image processing apparatus X including the configuration of the second embodiment, the NIC 5 performs the hierarchical energization controlling process.

As shown in FIG. 11, the NIC 5 individually outputs the control signals to all the automatic changeover switches 41 to 49 through an energization switching circuit 10*a* corresponding to the main energization switching circuit 10 shown in FIG. 4.

In the case of the second embodiment, the MPU 53 of the NIC 5 executes a predetermined control program to perform the energization control for the first sub-power source 221 to the ninth sub-power source 229 in accordance with the control rule shown in FIGS. 9 to 10. In this case, the NIC 5 acts as the entire function that performs the energization control for the function blocks.

Such a configuration also is one embodiment of the present invention.

The present invention is applicable to an image processing apparatus.

As described above, according to the present invention, it is controlled whether energization is individually performed for each of a plurality of function blocks sectionalized in accordance with each function, and only the required minimum function blocks can be controlled to become the energized state depending on the contents of the data processing request received from an external apparatus through a communicating medium when an image processing apparatus is in a power-saving state. As a result, power consumption can be reduced in the image processing apparatus as compared to the conventional case.

If the energization controlling unit performs the hierarchical energization controlling process to control sequential energization from higher to lower orders in the order of the main controlling block, the local controlling block, and the controlled block, the controlled block on the controlled side can certainly be prevented from falling into an unsafe situation where energization is started in an uncontrollable state, and a higher power-saving effect can be achieved since the frequency of energization is reduced in the controlled block, which has higher power consumption.

By performing the request buffering energization controlling process with the energization controlling unit, a plurality of the data processing requests with less urgency is temporarily accumulated and processed all together. As a result, power consumption can be reduced as compared to the case of starting energization of the function block to execute a process every time the data processing request is received.

The invention claimed is:

1. An image processing apparatus comprising:
a communicating medium that communicates with an external apparatus to at least receive a data processing request indicating one or more of a plurality of image processing related functions to be performed by the image processing apparatus;
a plurality of function blocks that are each a part of a group of parts sectionalized in accordance with different image processing related functions that can be requested to be performed by the data processing request;
at least one energization switching circuit that is operable to switch power from at least one power source to a plurality of function blocks in order to individually change the state of each of the plurality of function blocks from a non-energized state to an energized state so as to be able to perform an associated image processing related function or functions; and
at least one energization controlling unit that controls the at least one energization switching circuit to switch power from the at least one power source to the plurality of function blocks that correspond to the image processing related function or functions to be performed by the image processing apparatus as indicated by contents of the data processing request, the at least one energization controlling unit controlling energization of the at least one energization switching circuit to energize the function blocks that correspond to the image processing related function or functions to be performed by the image processing apparatus as indicated by contents of the data processing request and based on a determination of an existing state of the image processing apparatus.

2. The image processing apparatus of claim 1, wherein energization controlling unit controls the energization switching circuit to control timing at which at least one of the function blocks in a non-energized state is put into an energized state.

3. The image processing apparatus of claim 1, wherein the determination of the existing state of the image processing apparatus by the at least one energization control unit is made at the time of receiving the data processing request by the communicating medium from the external apparatus.

4. The image processing apparatus of claim 1, wherein the existing state of the image processing apparatus is one or both of an available capacity of a storage unit included in the image processing apparatus, and a control state of a weekly timer controlling unit that further controls the energization state of each of the function blocks by controlling the energization switching circuit in accordance with a predetermined weekly schedule.

5. The image processing apparatus of claim 1, wherein the communicating medium is configured to act as some or all of constituent elements of the energization controlling unit.

6. An image processing apparatus comprising a communicating medium that communicates with an external apparatus, the image processing apparatus further comprising:
an energization switching circuit that switches whether energization is performed for a power source that supplies power to a plurality of function blocks individually, each of which is a part of a group of parts sectionalized in accordance with functions; and
an energization controlling unit that controls the energization switching circuit based on contents of a data processing request to control energization of each of the function blocks when the communicating medium receives the data processing request from the external apparatus, wherein
the function blocks have hierarchical relationships from higher, to lower orders, and wherein
when switching the function blocks from a non-energized state to an energized state, the energization controlling unit performs a hierarchical energization controlling process to switch the function blocks to the energized state in the order from higher to lower blocks.

7. The image processing apparatus of claim 6, wherein the energization controlling unit includes a first energization controlling unit that controls a portion of the energization switching circuit that switches the energization switching circuit that switches the energization for the highest function block, and a second energization controlling unit included in the highest function block to control a portion of the energization switching circuit that switches the energization for the function block one-order lower than the relevant function block, and wherein when switching the function blocks from the non-energized state to the energized state, the energization controlling unit performs the hierarchical energization controlling process by performing a process of switching the highest function block to the energized state with the first energization controlling unit and a process of switching the one-order lower function block to the energized state with the second energization controlling unit included in the highest function block switched to the energized state.

8. The image processing apparatus of claim 7, wherein the function block capable of being switched by the energization switching circuit with regard to whether individually energized or not includes a plurality of controlled blocks that include one or both of a driving unit and a heating unit, a plurality of local controlling blocks that individually controls one or more of the plurality of the controlled blocks, and a main controlling block that gives/receives information necessary for a data process or information acquired from a data process to/from each of the plurality of the local controlling blocks, and wherein hierarchical relationships from higher to a lower orders are formed in the order of the main controlling block, the local controlling block, and the controlled block.

9. The image processing apparatus of claim 8, wherein the controlled block includes an image formation controlled block including a driving unit and a heating unit for an image forming process and an image read controlled block including a driving unit for an image read process and wherein the local controlling block includes an image formation controlling block that controls the driving unit and the heating unit of the image formation controlled block and an image read controlling block that controls the driving unit of the image read controlled block.

10. The image processing apparatus of any one of claims 7 to 9, wherein if any function blocks exist at a lower order than the function block that is a target of energization control, only when all those function blocks are in the non-energized state, the first energization controlling unit and the second energization controlling unit can switch the function block that is the target of the energization control from the energized state to the non-energized state.

11. The image processing apparatus of claim 6, wherein the energization controlling unit controls the energization switching circuit based on results of determination for contents of the data processing request, which are one or more whether the data process should be performed immediately due to the request, whether the execution of the data process is reserved by the request, whether the request is an image formation request, a size of image data in the case of the image formation request, a size of image data in the case of the image formation request, a type of image data in the case of the image formation request, a type of a page-description language used to express the image formation request in the case of the image formation request, whether the request is an image read request, and whether the request is a request for accessing a storage unit included in the image processing apparatus to manipulate a data file.

12. The image processing apparatus of claim 11, wherein if it is determined that the contents of the data processing request received by the communicating medium do not request immediate execution of the data process, when a predetermined execution start condition is satisfied after storing the data processing request in a predetermined storage unit, the energization controlling unit performs control of switching the function blocks corresponding to the data processing request stored in the storage unit from the non-energized state to the energized state.

13. The image processing apparatus of claim 12, wherein the predetermined execution start condition is one or more of conditions that a predetermined number of the data processing requests are stored in the storage unit, that a total data size of the data processing requests stored in the storage unit becomes a predetermined size or more, that a remaining capacity of the storage unit storing the data processing requests becomes less than a predetermined size, and that a predetermined time has elapsed since the first data processing request was stored in the storage unit.

14. The image processing apparatus of claim 6, wherein the energization controlling unit controls the energization switching circuit based on results of determination for the state of the image processing apparatus, which is one or both of an available capacity of the storage unit included in the image processing apparatus, and a control state of a weekly timer controlling unit that controls the energization state of each of the function blocks by controlling the energization switching circuit in accordance with a predetermined weekly schedule.

15. The image processing apparatus of claim 6, wherein the communicating medium is configured to act as some or all of constituent elements of the energization controlling unit.

\* \* \* \* \*